US007356405B1

(12) United States Patent
Nesbit

(10) Patent No.: US 7,356,405 B1
(45) Date of Patent: Apr. 8, 2008

(54) AUTOMATED ROUTE DETERMINATION TO AVOID A PARTICULAR MANEUVER

(75) Inventor: David W. Nesbit, Adamstown, MD (US)

(73) Assignee: AOL LLC, Dulles, VA (US)

( * ) Notice: Subject to any disclaimer, the term of this patent is extended or adjusted under 35 U.S.C. 154(b) by 0 days.

(21) Appl. No.: 11/136,377

(22) Filed: May 25, 2005

Related U.S. Application Data

(63) Continuation of application No. 10/330,669, filed on Dec. 30, 2002, now Pat. No. 7,133,771, and a continuation-in-part of application No. 10/259,793, filed on Sep. 30, 2002, now abandoned, and a continuation-in-part of application No. 10/259,789, filed on Sep. 30, 2002, and a continuation-in-part of application No. 10/259,788, filed on Sep. 30, 2002.

(60) Provisional application No. 60/406,629, filed on Aug. 29, 2002.

(51) Int. Cl.
*G01C 21/00* (2006.01)

(52) U.S. Cl. ............... 701/202; 701/201; 701/207; 701/208; 701/209; 701/210; 701/211

(58) Field of Classification Search ........ 701/201–202, 701/207–211; 340/994, 995.19, 991–992
See application file for complete search history.

(56) References Cited

U.S. PATENT DOCUMENTS 4,812,990 A * 3/1989 Adams et al. ................. 701/3
5,220,507 A * 6/1993 Kirson ......................... 701/202
5,311,173 A   5/1994 Komura et al.
5,504,482 A   4/1996 Schreder
5,508,930 A * 4/1996 Smith, Jr. ..................... 701/201
5,513,110 A   4/1996 Fujita et al. .................. 701/207
5,615,116 A * 3/1997 Gudat et al. .................. 701/23
5,712,788 A * 1/1998 Liaw et al. ................... 701/209
5,752,217 A   5/1998 Ishizaki et al.

(Continued)

FOREIGN PATENT DOCUMENTS

WO    WO 00/22593    4/2000

OTHER PUBLICATIONS

Fredrik Bergholm et al., Analysis of current approaches in vision-based navigation, from http://72.14.203.104/search?, printed on Apr. 28, 2006.*

(Continued)

*Primary Examiner*—Cuong Nguyen
(74) *Attorney, Agent, or Firm*—Fish & Richardson P.C.

(57) ABSTRACT

A preferred route may be determined from an origin location to a destination location. The preferred route avoids a particular maneuver or particular maneuvers identified by a user. The determination is made by processing directed links (e.g., one-way edges) in a graph that includes one or more links and two or more nodes. The determination of a preferred route may include an estimate of the time required at one or more intersections along alternative routes and/or an estimate of the time required to travel the alternative routes based on the day of the week or the day of the year in which travel occurs. Individual routing preferences, such as a preference of a rural over an urban route and avoiding particular maneuvers in a route, also may be considered.

24 Claims, 13 Drawing Sheets

U.S. PATENT DOCUMENTS

| | | | |
|---|---|---|---|
| 5,797,106 A * | 8/1998 | Murray et al. | 701/11 |
| 5,802,492 A | 9/1998 | DeLorme et al. | |
| 5,850,193 A | 12/1998 | Shimoura et al. | |
| 5,884,213 A * | 3/1999 | Carlson | 701/206 |
| 5,910,177 A * | 6/1999 | Zuber | 701/202 |
| 5,911,773 A | 6/1999 | Mutsuga et al. | 701/200 |
| 5,938,720 A * | 8/1999 | Tamai | 701/209 |
| 5,948,040 A | 9/1999 | DeLorme et al. | |
| 5,974,419 A * | 10/1999 | Ashby | 707/100 |
| 5,991,689 A * | 11/1999 | Aito et al. | 701/209 |
| 6,016,485 A | 1/2000 | Amakawa et al. | 705/400 |
| 6,023,655 A | 2/2000 | Nomura | 701/208 |
| 6,049,753 A | 4/2000 | Nimura | |
| 6,072,409 A | 6/2000 | Fushimi et al. | 640/995.19 |
| 6,098,016 A | 8/2000 | Ishihara | 701/209 |
| 6,122,593 A * | 9/2000 | Friederich et al. | 701/202 |
| 6,128,574 A * | 10/2000 | Diekhans | 701/209 |
| 6,192,314 B1 | 2/2001 | Khavakh et al. | 701/209 |
| 6,195,611 B1 | 2/2001 | Sakamoto et al. | 701/209 |
| 6,246,957 B1 * | 6/2001 | Barrer et al. | 701/202 |
| 6,249,742 B1 * | 6/2001 | Friederich et al. | 701/202 |
| 6,259,988 B1 * | 7/2001 | Galkowski et al. | 701/202 |
| 6,278,939 B1 * | 8/2001 | Robare et al. | 701/208 |
| 6,278,942 B1 * | 8/2001 | McDonough | 701/210 |
| 6,282,489 B1 * | 8/2001 | Bellesfield et al. | 701/201 |
| 6,285,950 B1 * | 9/2001 | Tanimoto | 701/201 |
| 6,289,277 B1 * | 9/2001 | Feyereisen et al. | 701/202 |
| 6,292,743 B1 * | 9/2001 | Pu et al. | 701/202 |
| 6,292,745 B1 * | 9/2001 | Robare et al. | 701/208 |
| 6,317,685 B1 * | 11/2001 | Kozak et al. | 701/210 |
| 6,324,470 B1 * | 11/2001 | White | 701/209 |
| 6,338,021 B1 | 1/2002 | Yagyu et al. | |
| 6,349,261 B1 | 2/2002 | Ohnishi et al. | |
| 6,351,707 B1 | 2/2002 | Ichikawa | |
| 6,356,911 B1 | 3/2002 | Shibuya | |
| 6,424,910 B1 * | 7/2002 | Ohler et al. | 701/202 |
| 6,424,912 B1 * | 7/2002 | Correia et al. | 701/209 |
| 6,427,119 B1 * | 7/2002 | Stefan et al. | 701/209 |
| 6,430,501 B1 * | 8/2002 | Slominski | 701/209 |
| 6,456,933 B1 * | 9/2002 | Hessing | 701/209 |
| 6,529,821 B2 * | 3/2003 | Tomasi et al. | 701/202 |
| 6,577,937 B1 | 6/2003 | Shuman et al. | |
| 6,591,188 B1 * | 7/2003 | Ohler | 701/209 |
| 6,601,073 B1 * | 7/2003 | Robare | 707/104.1 |
| 6,671,615 B1 * | 12/2003 | Becker et al. | 701/200 |
| 6,708,110 B2 * | 3/2004 | Stefan et al. | 701/209 |
| 6,725,156 B2 * | 4/2004 | Kaplan | 701/209 |
| 6,728,630 B1 * | 4/2004 | Burt et al. | 701/202 |
| 6,785,608 B1 * | 8/2004 | Milici et al. | 701/209 |
| 6,922,633 B2 | 7/2005 | Takenaka | |
| 6,996,469 B2 * | 2/2006 | Lau et al. | 701/210 |
| 7,133,771 B1 | 11/2006 | Nesbitt | |
| 2001/0021895 A1 | 9/2001 | Yamazaki | |
| 2001/0047241 A1 | 11/2001 | Khavakh et al. | |
| 2001/0056325 A1 * | 12/2001 | Pu et al. | 701/202 |
| 2002/0011941 A1 | 1/2002 | Endo et al. | |
| 2002/0077745 A1 | 6/2002 | Ohmura et al. | 701/208 |
| 2002/0087262 A1 * | 7/2002 | Bullock et al. | 701/202 |
| 2002/0183922 A1 * | 12/2002 | Tomasi et al. | 701/202 |
| 2003/0060973 A1 * | 3/2003 | Mathews et al. | 701/209 |
| 2003/0065805 A1 | 4/2003 | Barnes, Jr. | |
| 2003/0093219 A1 * | 5/2003 | Schultz et al. | 701/202 |

OTHER PUBLICATIONS

Allory Deiss, Garmin GPS feature comparisons and upgrade information, Apr. 7, 2006.*

A case study of fuzzy-logic-based robot navigation, Valavanis, K.P.; Doitsidis, L.; Long, M.; Murphy, R.R.; Robotics & Automation Magazine, IEEE, vol. 13, Issue 3, Sep. 2006 pp. 93-107, Digital Object Identifier 10.1109/MRA.2006.1678143.*

Navigational accesses in a temporal object model, Bertino, E.; Ferrari, E.; Guerrini, G.; Knowledge and Data Engineering, IEEE Transactions on, vol. 10, Issue 4, Jul.-Aug. 1998 pp. 656-665, Digital Object Identifier 10.1109/69.706062.*

A versatile and safe mobility assistant, Lankenau, A.; Rofer, T.; Robotics & Automation Magazine, IEEE, vol. 8, Issue 1, Mar. 2001 pp. 29-37, Digital Object Identifier 10.1109/100.924355.*

Depth-map-based scene analysis for active navigation in virtual angioscopy, Haigron P.; Bellemare, M.E.; Acosta, O.; Goksu, C.; Kulik, C.; Rioual, K.; Lucas, A.; Medical Imaging, IEEE Transactions on, vol. 23, Issue 11, Nov. 2004 pp. 1380-1390, Digital Object Identifier 10.1109/TMI.2004.836869.*

Geometric travel planning, Edelkamp, S.; Jabbar, S.; Willhalm, T.; Intelligent Transportation Systems, IEEE Transactions on vol. 6, Issue 1, Mar. 2005 pp. 5-16, Digital Object Identifier 10.1109/TITS.2004.838182.*

Path planning and evaluation in IVHS databases, Yang, T.A.; Shekhar, S.; Hamidzadeh, B.; Hancock, P.A.; Vehicle Navigation and Information Systems Conference, 1991, vol. 2, Oct. 20-23, 1991 pp. 283-290.*

Reliable pre-trip multi-path planning and dynamic adaption for a centralized road navigation system, Chen, Y.Y.; Bell, M.G.H.; Bogenberger, K.; Intelligent Transportation Systems, 2005. Proceedings. 2005 IEEE, Sep. 13-15, 2005 pp. 257-262 Digital Object Identifier 10.1109/ITSC.2005.1520057.*

Office Action issued in U.S. Appl. No. 10/259,789, mailed Feb. 27, 2007, 9 pages.

Office Action issued in U.S. Appl. No. 10/259,788, mailed Apr. 9, 2007, 11 pages.

Office Action issued in U.S. Appl. No. 10/259,789 mailed Jul. 8, 2003, 16 pages.

Office Action issued in U.S. Appl. No. 10/330,560 mailed Jul. 17, 2007, 9 pages.

* cited by examiner

300A

AUTOMATED ROUTE DETERMINATION TO AVOID A PARTICULAR MANEUVER

CROSS REFERENCE TO RELATED APPLICATIONS

This application is a continuation application of U.S. application Ser. No. 10/330,669, filed Dec. 30, 2002, now U.S. Pat. No. 7,133,771, and titled "Automated Route Determination to Avoid a Particular Maneuver", which claims the benefit of U.S. Provisional Application No. 60/406,629, titled "Automated Route Determination" and filed Aug. 29, 2002 and is a continuation-in-part of U.S. application Ser. No. 10/259,788, titled "Automated Route Determination" and filed Sep. 30, 2002, U.S. application Ser. No. 10/259,789, titled "Automated Route Determination" and filed Sep. 30, 2002, and U.S. application Ser. No. 10/259,793, titled "Automated Route Determination" and filed Sep. 30, 2002 now abandoned, all of which are incorporated by reference in their entirety.

TECHNICAL FIELD

This document relates to determining a preferred route between an origin location and a destination location.

BACKGROUND

A preferred route between an origin location and a destination location may be determined by a computer system. A computer system may be used to search for an optimal path through a directed graph (e.g., a collection of nodes and edges) that represents a network of roads and intersections. Each edge (or line) of the graph may represent a road in a map, and each node of the graph may represent an intersection of two or more roads or a terminal point of a road, such as a dead end road. The path that requires the least distance or time may be determined, for example, by using the Dijkstra method or A* method. The conventional Dijkstra method or A* method may determine the optimal route based on the distance and/or time required to travel between two nodes.

SUMMARY

In one general aspect, a preferred route may be determined using a computer-implemented routing system. The routing system is used to access an origin and a destination in a routing graph. The routing graph represents a network of roads. The routing graph includes two or more nodes and one or more links. Each link represents a road, and each node represents an intersection of one or more roads or an intersection of a terminal road. A user-selected indication of at least one maneuver to be avoided is received. The routing system is used to determine a preferred route from the origin to the destination, with the route not including the at least one maneuver in the received indication.

Implementations may include one or more of the following features. For example, the routing system may determine a first route that includes maneuvers from the origin to the destination. The received user-selected indication may be an indication of one or more maneuvers of the first route to be avoided. The preferred route may be communicated from the routing system to a user system. Receiving the user-selected indication and determining a preferred route may be repeated as additional user-selected indications are received.

The preferred route may be a preferred route for driving a vehicle from the origin to the destination or may be a preferred route for walking from the origin to the destination. The routing system may be a routing system provided through an Internet service provider. The routing system and the user system may use the same processor. The preferred route may be communicated from the routing system to the user system over a connection establishing using the Internet.

Implementations of the techniques described may include a method or process, an apparatus or system, or computer software on a computer-accessible medium. The details of one or more implementations are set forth below. Other features will be apparent from the description and drawings, and from the claims.

DESCRIPTION OF DRAWINGS

Like reference symbols in the various drawings indicate like elements.

DETAILED DESCRIPTION

Techniques are provided for determining a preferred route from an origin location to a destination location. The preferred route avoids a particular maneuver or maneuvers identified by a user. In general, the routing determination is made by processing directed links (e.g., one-way edges) in a graph that includes one or more links and two or more nodes. The determination of a preferred route may include an estimate of the waiting time required at one or more intersections along alternative routes and/or an estimate of the time required to travel the alternative routes based on the day of the week or the day of the year that travel is to occur. Individual routing preferences, such as a preference of a rural route over an urban route or a preference to avoid particular maneuvers in a route, also may be considered. Techniques are described that may help reduce the time required to identify a preferred route, including the identification and removal of paths leading into regions where no outlet or through route exists before processing the directed links, data initialization techniques, and techniques using particular data formats.

Figure 1:
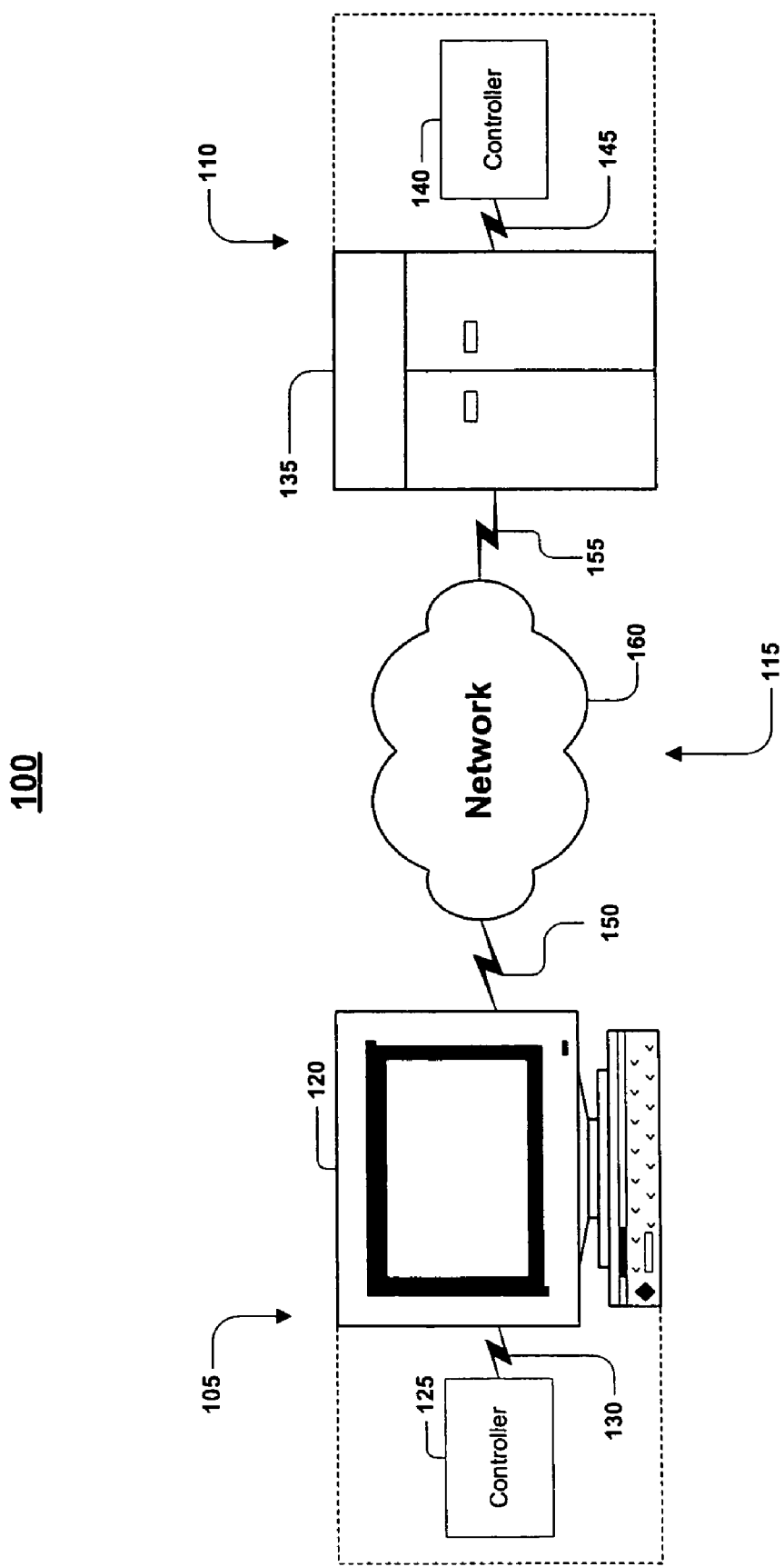
FIG. 1 is a block diagram of a communications system capable of determining a preferred route.
Figure 2:
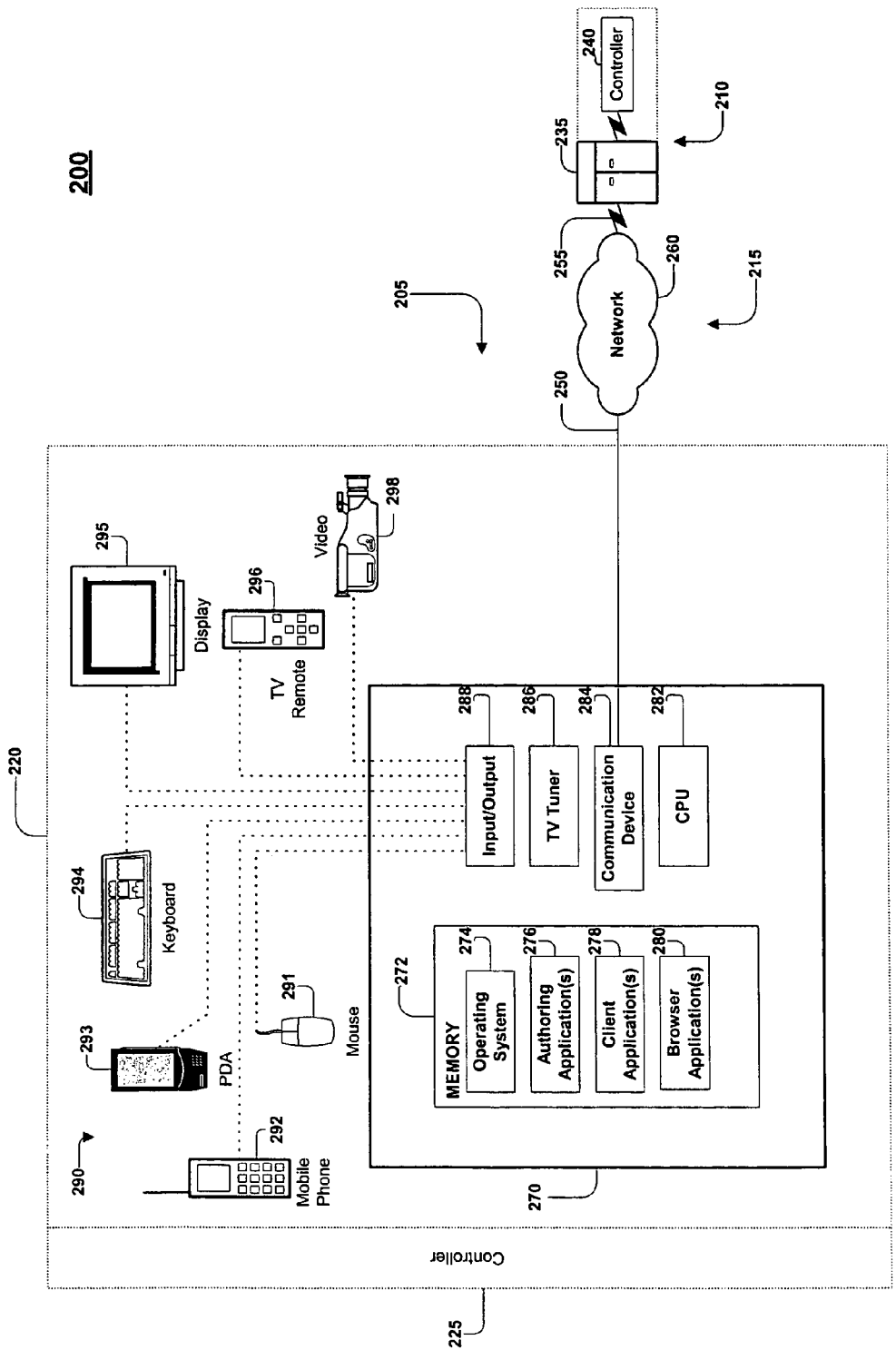
FIG. 2 is an expansion of the block diagram of FIG. 1.

For illustrative purposes, FIGS. 1 and 2 describe a communications system that may be used to request and provide routes between origin and destination locations. For brevity, several elements in the figures described below are represented as monolithic entities. However, as would be understood by one skilled in the art, these elements each may include numerous interconnected computers and components designed to perform a set of specified operations and/or dedicated to a particular geographical region.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host device 135) is generally capable of executing instructions under the command of a client controller 125 (or a host controller 140). The client device 120 (or the host device 135) is connected to the client controller 125 (or the host controller 140) by a wired or wireless data pathway 130 or 145 capable of delivering data.

Each of the client device 120, the client controller 125, the host device 135, and the host controller 140 typically includes one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of the client controller 125 or the host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 that provides a direct or indirect communication link between the client system 105 and the host system 110, irrespective of physical separation. Examples of a delivery network 160 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line)), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 that enable communications through the one or more delivery networks 260.

Examples of each element within the communication system of FIG. 2 are broadly described above with respect to FIG. 1. In particular, the host system 210 and the communications link 215 typically have attributes comparable to those described with respect to the host system 110 and the communications link 115 of FIG. 1, respectively. Likewise, the client system 205 of FIG. 2 typically has attributes comparable to, and may illustrate one possible implementation of, the client system 105 of FIG. 1.

The client device 220 typically includes a general purpose computer 270 having an internal or external storage 272 for storing data and programs such as an operating system 274 (e.g., DOS, Windows®, Windows® 95, Windows® 98, Windows® 2000, Windows® NT, Windows® Millennium Edition, Windows® XP, OS/2, and Linux) and one or more application programs. Examples of application programs include authoring applications 276 (e.g., word processing, database programs, spreadsheet programs, presentation programs, and graphics programs) capable of generating documents or other electronic content; client applications 278 (e.g., AOL ("America Online") client, CompuServe client, AIM ("America Online Instant Messenger") client, AOL TV ("America Online Television") client, and an ISP ("Internet Service Provider") client) capable of communicating with other computer users, accessing various computer resources, and viewing, creating, or otherwise manipulating electronic content; and browser applications 280 (e.g., Netscape's Navigator and Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and executed by one or more device(s) external to the general-purpose computer 270.

The general-purpose computer 270 typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by the communications device 284 and television programming content received by the TV tuner 286.

The general-purpose computer 270 typically will include an input/output interface 288 to enable a wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers. Other examples may include voice recognition and synthesis devices.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities, and may function as a client device 220 by accessing the delivery network 260 and communicating with the host system 210. Furthermore, the client system 205 may include one, some, all, or none of the components and devices described above.

Figure 3:
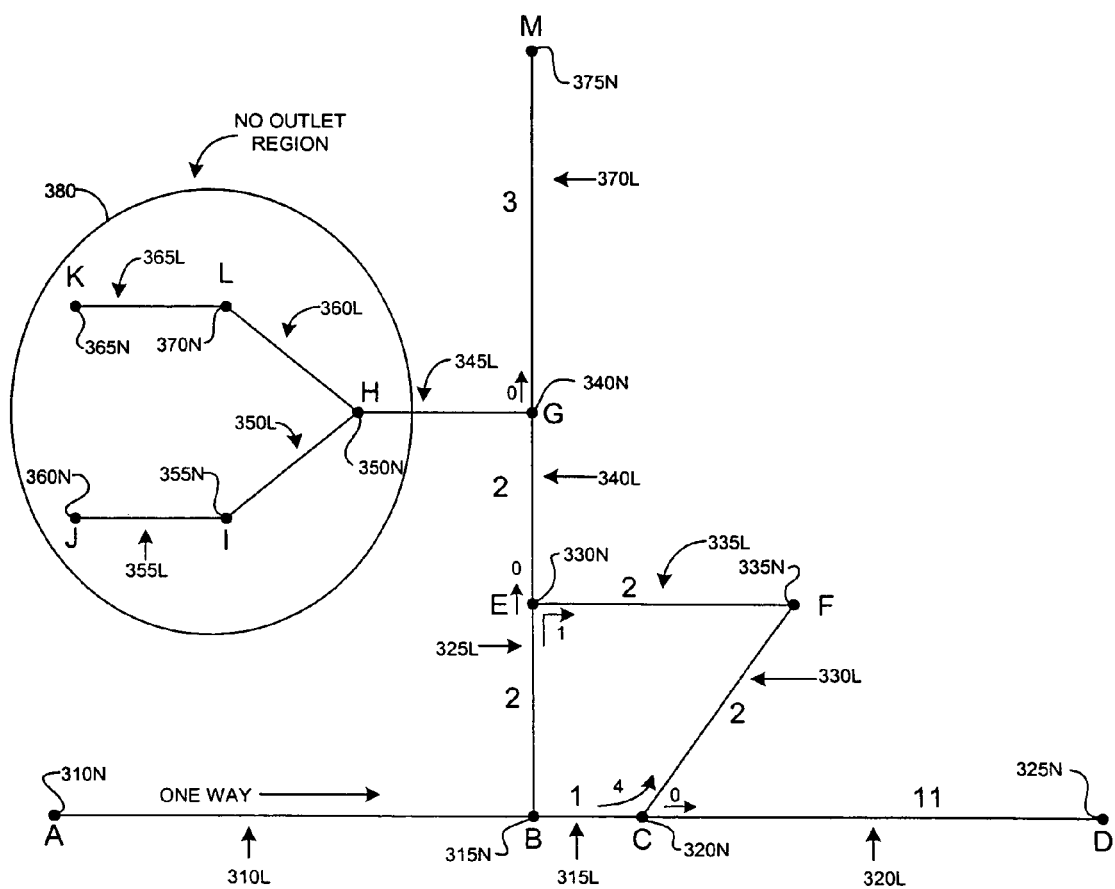
FIGS. 3A, 3 and 4 are diagrams illustrating a process to determine a preferred route between two nodes on a routing graph.
Figure 3A:
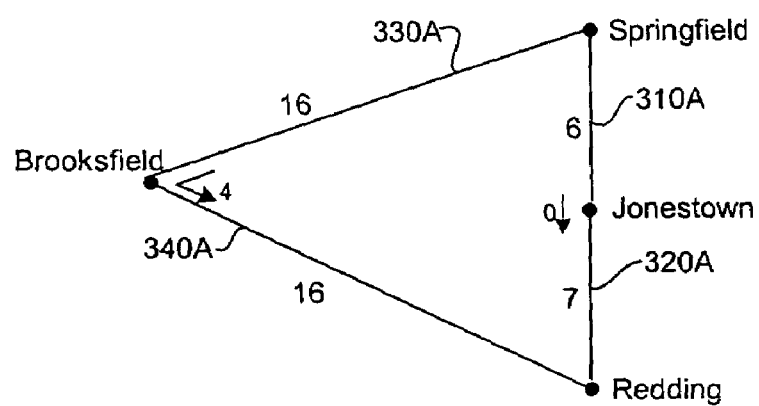

FIG. 3A illustrates an exemplary process to determine a preferred route from an origin location ("origin") to a destination location ("destination") on a routing graph 300A. Routing graph 300A includes a Springfield node, a Jonestown node, a Redding node, and a Brooksfield node. Each node represents a particular city. Directed link 310A represents a road that connects Springfield with Jonestown. Directed link 320A represents a road that connects Jonestown with Redding. Directed link 330A represents a road that connects Springfield with Brooksfield. Directed link 340A represents a road that connects Brooksfield with Redding.

A process to determine a preferred route from Springfield to Redding begins by determining which of the directed links 310A and 330A that are adjacent to the origin, Springfield, should be examined first. The directed link 330A is examined first because directed link 310A has a lower cost (here, 6) than directed link 330A that has a cost of 16. The routing system determines that the destination Redding has not yet been found and proceeds to expand the route from directed link 310A.

The route is expanded from directed link 310A to include directed link 320A. The routing system determines an accumulated cost of the route from Springfield to Redding. The accumulated cost of the route is determined by including the cost from the origin to the previous directed link (here, 6), an intersection cost associated with traveling through the intersection of the previous directed link and the adjacent directed link (here, 0), and a cost associated with traversing the adjacent directed link (here 7). The accumulated cost of traveling from Springfield to Redding is 13. The routing system determines that the destination Redding has been found.

The alternative route from Springfield to Brooksfield to Redding has an accumulated cost of 36. The accumulated cost of the Springfield to Brooksfield to Redding is based on a cost from the origin Springfield to Brooksfield (here, 16), the intersection cost of traveling through the Brooksfield intersection (here, 4), and the cost of traveling from Brooksfield to Redding (here, 16). The cost of the route from Springfield to Jonestown to Redding (here, 13) is less than the cost of the route from Springfield to Brooksfield to Redding (here, 36), and as such, the route from Springfield to Jonestown to Redding is the preferred route.

Various aspects of this simplified illustration are described more fully in the following, as are various other features and combinations of features.

Figure 4:
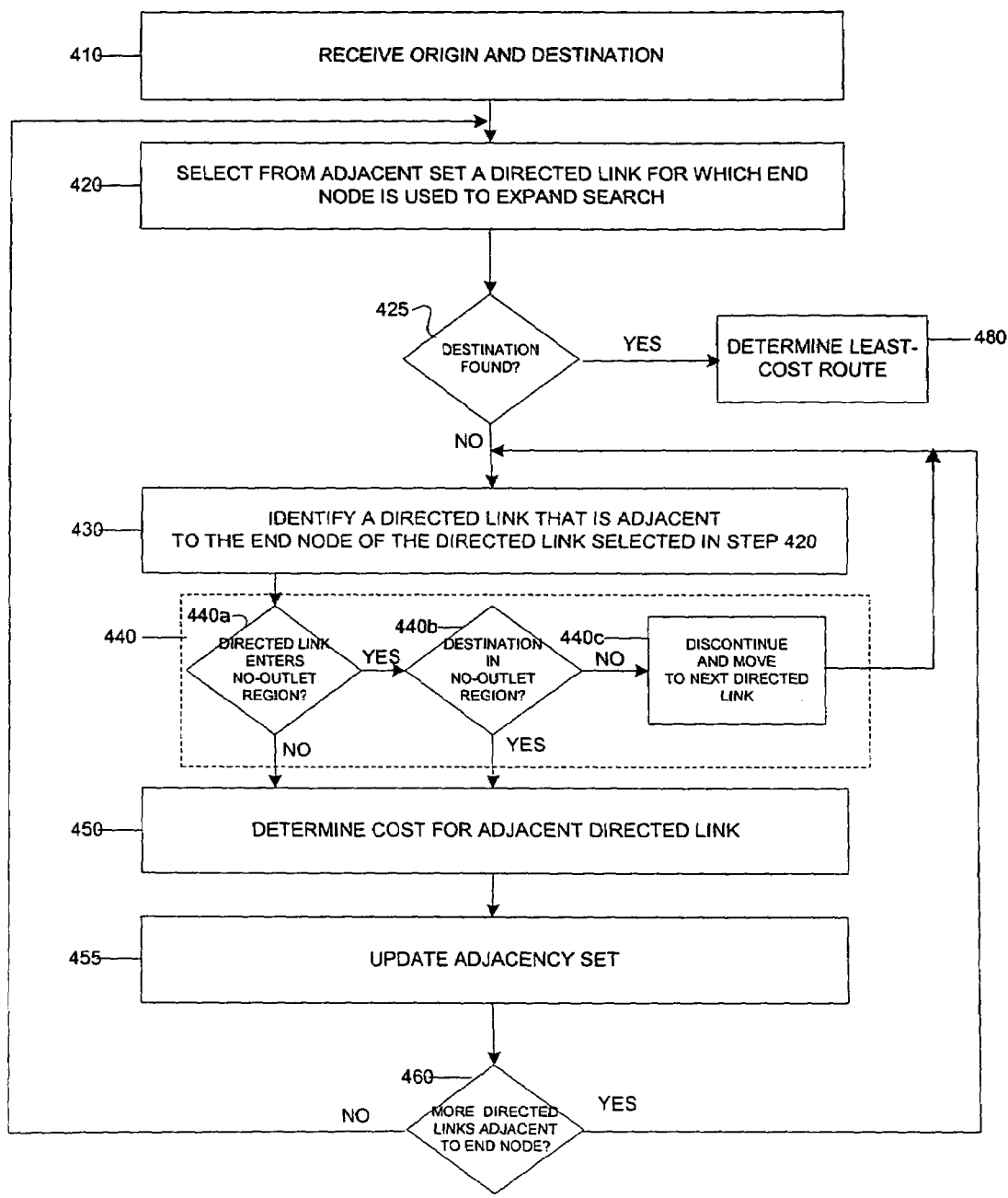

Referring to FIGS. 3 and 4, a process determines a preferred route from an origin to a destination on a routing graph 300. The determination of a preferred route also may be referred to as a search for a preferred route. In some cases, a preferred route may be an optimal route based on time and/or distance traveled. In other cases, a preferred route may be a non-optimal route. For example, a route that circumvents an urban area may be preferred even when the route is longer than a corresponding urban route.

In general, the routing graph 300 includes a collection of directed links (e.g., one-way edges) and nodes. A node on the routing graph 300 is represented by a point and is labeled by an uppercase alphabetic character (e.g., A, B, or C). A directed link on the routing graph 300 is represented by a line (or edge) that connects two nodes. A directed link may be referenced using an ordered pair of nodes where the order of the nodes corresponds to the direction of travel. For example, a line between two nodes B and C includes two directed links, namely a directed link from B to C that may be referred to as directed link BC, and another directed link from C to B that may be referred to as directed link CB.

The routing graph 300 includes directed links AB 310L, BC 315L, CD 320L, BE 325L, CF 330L, EF 335L, EG 340L, GH 345L, HL 350L, I 355L, HL 360L, LK 365L, and GM 370L. The routing graph also includes other directed links (e.g., CB, DC, and EB). The routing graph 300 also includes nodes A 310N, B 315N, C 320N, D 325N, E 330N, F 335N, G 340N, H 350N, I 355N, J 360N, K 365N, L 370N, and M 375N.

FIG. 4 illustrates a process 400 to determine a preferred route using directed links. The process may be performed by a routing system, such as, for example, host system 110 of FIG. 1 or host system 210 of FIG. 2. In general, to determine a preferred route, the routing system processes a particular directed link from a set of directed links by identifying one or more directed links that are adjacent to the end node of the particular directed link. For each directed link identified, the routing system determines a cost associated with the directed link and adds the directed link and its associated cost to the set of directed links. The routing system continues by selecting a directed link from the set and identifying one or more directed links that are adjacent (e.g., expanding the search set) until the destination has been reached or found. The destination has been reached, for example, when one or more identified directed links that include the destination as an end node. The preferred route is determined based on the collection of identified directed links (e.g., a route) that has the lowest cost.

The process 400 begins when an origin and a destination are received or otherwise obtained by the routing system (step 410). The origin received may be a directed link or a node that is associated with an origin location from which the preferred route is to start. Similarly, the destination received may be a directed link or a node from which the preferred route is to end. When a node is received as an origin, a directed link that includes the origin node as an end node may be identified. The identified directed link may be placed in a directed link list. Alternatively, one or more directed links that are adjacent to the origin node may be identified and placed in a directed link list. The directed link list may be referred to as an adjacency set or a priority set.

The adjacency set may be organized as a data set, a database table, an object instance, a linked list, an XML-document, a text file, or another data structure. The data structure may be stored in persistent or transient storage, including a portion of memory of the routing system.

The routing system selects a directed link from the adjacency set (step 420). The end node of the selected directed link is used as a focus point from which one or more adjacent direct links are identified, processed, and added to the adjacency set. This may be referred to as expanding the search or expanding the adjacency set. The routing system may select a particular directed link from the adjacency set based on a cost associated with the directed link. The routing system may select the directed link associated with the least cost. For example, the directed links in the adjacency set may be maintained in order from the least cost to the greatest cost (i.e., sorted by cost). The routing system then may select the directed link that appears first in the adjacency set to select the directed link with the least cost. Some implementations may use other processes or software engineering techniques to determine the directed link with the least cost and/or otherwise determine a focus point for the search.

When a directed link has been selected from the adjacency set (step 420), the routing system then determines whether the destination has been found or identified (step 425). For example, the routing system determines whether the selected directed link corresponds to the destination directed link received. The routing system also may determine whether the selected directed link has an end node equal to the destination end node. In some implementations, the directed link may be added to the done set when the directed link is selected in step 420.

When the routing system determines that the destination has not been found (step 425), the routing system identifies a directed link that is adjacent to the end node of the selected directed link (step 430). The identified directed link may be referred to as an adjacent directed link. To identify a directed link that is adjacent to the end node, the routing system may access node information stored in a table or list. The node information may include a list of the directed links that are adjacent to each node in the routing graph. This may be referred to as an adjacent directed link list. The routing system may identify a directed link that is adjacent to an end node by selecting one of the directed links in the adjacent directed link list.

In some implementations, the routing system may select a directed link from the adjacent directed link list based on the order in which the directed links are presented in the list of directed links. If so, the order of the directed links in the directed link list in the node information may help reduce the time required to determine a preferred route. For example, when determining a driving route, the driveable directed links may be presented first. A driveable link refers to a directed link that may be used by a vehicle proceeding in the direction of the directed link. A two-way road is an example of a driveable link. In contrast, a directed link is not a driveable directed link when the directed link is a one-way road having a travel direction not in the desired direction. A routing system that selects the driveable directed links to process before the selection of directed links that are not driveable may result in a more efficient routing determination process.

Alternatively or additionally, a routing system may identify a directed link that is adjacent to the end node of the selected directed link based on the access of directed link information that includes the start node of the directed link. The routing system may identify a directed link in step 430 by searching the directed link information to identify a particular directed link that includes a start node that matches the end node of the selected directed link.

The routing system determines whether the adjacent directed link is a directed link that enters a no-outlet region, and, if so, processes the directed link accordingly (step 440). A no-outlet region refers to a region of a routing graph that, when entered, may only be exited by traversing the reverse directed link used to enter the region. In FIG. 3, for example, a no-outlet region 380 may include the directed links GH 345L, HI 350L, IJ 355L, HL 360L, and LK 365L. The corresponding directed links in the opposition direction HG, IH, JI, KL, and LH also are within the no-outlet region. The directed link GH 345L is a directed link that enters the no-outlet region, and may be identified as a directed link that occurs within the no-outlet region. In some implementations, the directed link (here, GH 345L) that enters the no-outlet region may not be identified as a directed link that occurs within the no-outlet region.

The determination of whether the directed link is a directed link that enters a no-outlet region and associated conditional processing (step 440) includes three sub-steps. The first sub-step is the determination of whether the directed link is a directed link that enters a no-outlet region (sub-step 440*a*). The routing system may make the determination of whether the directed link is a directed link that enters a no-outlet region, for example, based on directed link information stored in a table or list. The directed link information may include whether a particular directed link enters a no-outlet region. The routing system may identify directed links that enter a no-outlet region, for example, based on a process described below with respect to FIG. 10.

Figure 10:
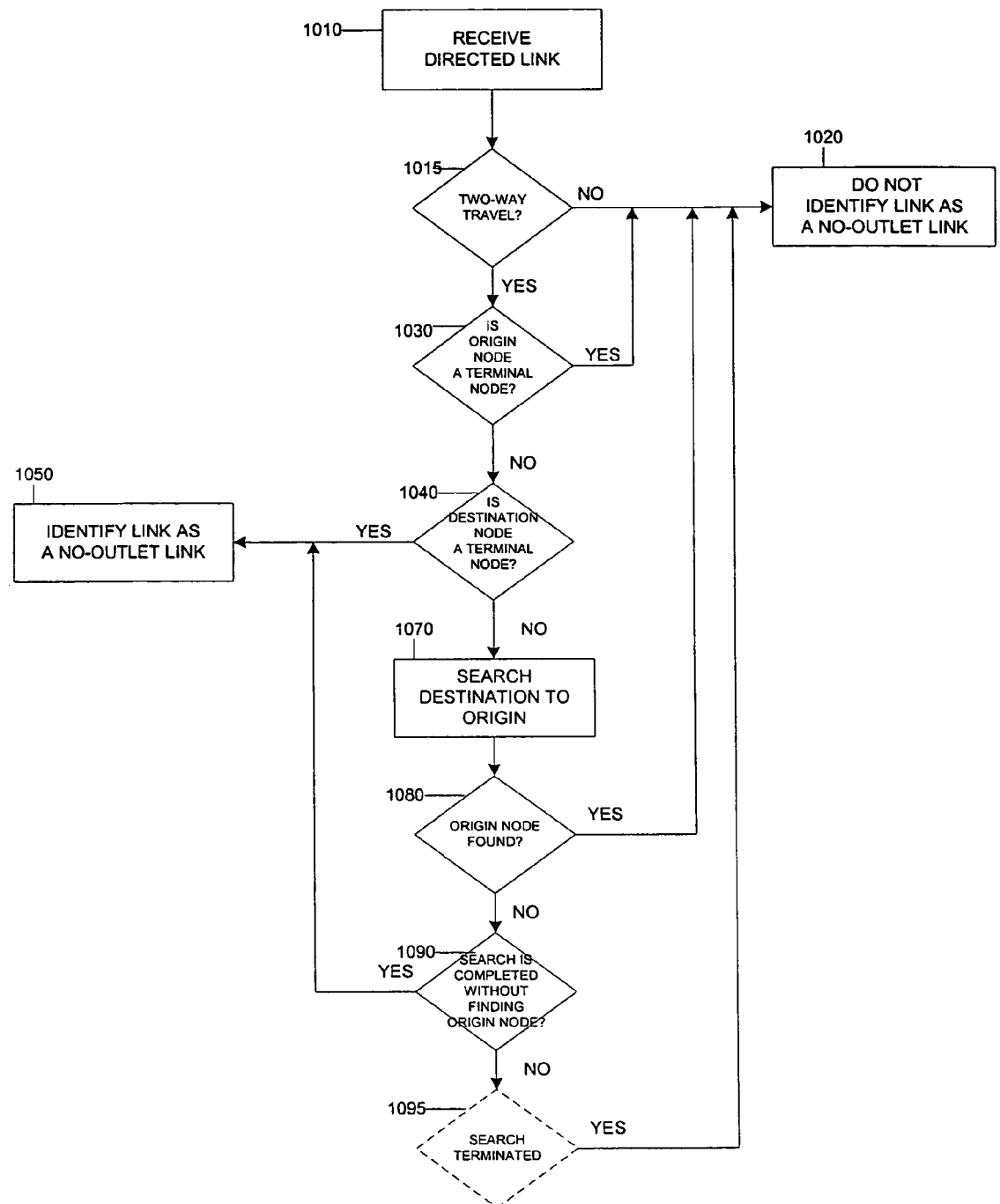

Alternatively or additionally, the routing system may make the determination of whether a directed link is a directed link that enters a no-outlet region, for example, based on the dynamic execution of a process the same as or similar to the process described with respect to FIG. 10.

When the routing system determines that the adjacent directed link is not a directed link that enters a no-outlet region (sub-step 440*a*), the routing system determines a cost for the adjacent directed link (step 450). The cost determined may include the cost from the origin to the previous directed link, an intersection cost associated with traveling through the intersection of the previous directed link and the adjacent directed link, and a cost associated with traversing the adjacent directed link.

The cost from the origin to the previous directed link may be determined based on the accumulated cost associated with the previous directed link. Alternatively, the cost from the origin to the previous directed link may be determined based on the storage by the routing system of an aggregate cost of the each particular route that is included in the search process.

The intersection cost associated with traveling through the intersection of the previous directed link and the adjacent directed-link may be based on the inferred presence of a stop sign, yield sign, traffic light, or other type of traffic control that may increase the likelihood of a stop at an intersection. The likelihood of a stop at an intersection may be referred to as a stop level of the intersection. The stop level may also include an estimate of the length of time waiting at the intersection. The stop level of the intersection may be based on the types of roads that intersect. For example, the stop level of an intersection may be based on the intersection of two roads of differing road class type (e.g., an interstate, a U.S. highway, a state road, and a local road). The stop level that may be assigned to an intersection may be a value that occurs within a predetermined range of allowed values. For example, a stop level may be from negative two to two. Negative stop level values may represent more favorable conditions (e.g., a stop is less likely to occur and the time cost associated with the intersection is less severe). Positive stop level values may represent less favorable conditions (e.g., a stop is more likely to occur and the time cost associated with the intersection is more severe).

Additionally or alternatively, a name change of roads associated with the intersection may be determined. A higher intersection cost may be associated with a road name change than an intersection cost that does not include a road name change.

Additionally or alternatively, the intersection cost associated with traveling through the intersection of the previous directed link and the adjacent directed link may be based on the geometry of the roads at the intersection. The geometry of the intersection may describe the number of roads and the orientation of each road to one or more other roads that intersect.

Additionally or alternatively, the intersection cost associated with traveling through the intersection of the previous directed link and the adjacent directed link may be based on one or more conditions that may include an intersection with a turn restriction, a false intersection, a ferry, a ramp-to-ramp transition, a merge from a ramp to a non-ramp, an exit from a non-ramp to a ramp, a first limited-access link to a second limited-access link, a limited-access link to a non-limited access link, an intersection with three links, or an intersection with four or more links.

The routing system may determine the intersection cost associated with traveling through the intersection of the previous directed link and the adjacent directed link, for example, based on directed link information stored in a table or list that includes an intersection cost associated with a particular turn in an intersection. The intersection cost information for a turn in an intersection may be determined by a process described below with respect to FIG. 9. Alternatively or additionally, the routing system may make the determination of an intersection cost for an intersection, for example, based on the dynamic execution of a process the same as or similar to the process described with respect to FIG. 9. The use of an intersection cost may result in a route that has fewer maneuver changes (e.g., the route may tend to stay on the same roads longer) than if an intersection cost was not included in the cost of the route.

The cost associated with traversing the adjacent directed link may be based on a variable cost or a default cost. The variable cost may be based on the time of day and the day of the week on which the directed link is to be traveled. Such a variable cost may be referred to as a time-dependent variable cost. The use of such a time-dependent variable cost may be useful in distinguishing predictable traffic congestion due to commuting patterns. For example, certain roads that enter an urban area likely to be congested in a morning rush hour and an evening rush hour during a weekday (i.e., Monday, Tuesday, Wednesday, Thursday or Friday). The same roads may not be congested during other times during a weekday and may not be congested during a weekend day (i.e., Saturday or Sunday). The same roads also may not be congested during a holiday, even when the holiday occurs on a weekday.

The ability to distinguish a time-dependent variable cost based on the day of the week may be beneficial. For example, a preferred route may include a particular road when the road is not likely to be congested, whereas the particular road may not be included in a preferred road when the road is likely to be congested. This may occur, for instance, when a particular road along a relatively direct route is likely to be congested based on a commuting pattern, while a road along an alternate and relatively indirect road is not likely to be congested. The ability to include the alternate and relatively indirect route when commuting congestion commonly occurs (e.g., based on the day of the week on which travel is to occur, or the day of the week and the time of day at which travel is to occur), and to include the relatively direct route when commuting congestion does not commonly occur, may be useful. In this way, routing for weekend travel is not burdened by routing information for weekday commuter congestion. Similarly, the ability to distinguish a time-dependent variable based on the day of the year may be used to avoid burdening holiday travel routing with routing information based on weekday commuter congestion, even when the travel is to occur during a commuting time (but not a commuting day).

The time-dependent variable cost may be based on historical data, observational data, or other empirical data. The time-dependent variable cost also may be based on intuitive information or other types of assumptions about traffic patterns.

The default cost associated with traversing the adjacent directed link may be a cost that is applied independently of the time-dependent variable cost for traversing the adjacent directed link. The default cost associated with traversing the adjacent directed link may be a predetermined cost value for traversing the adjacent directed link. The cost also may be a cost value that is determined based on a formula. For example, a cost may be determined based on the length of the adjacent directed link multiplied by a reciprocal of an estimate of an assumed travel speed or other assumed travel speed. The assumed travel speed may be multiplied by a factor that favors or disfavors the directed link in the determination of a preferred route.

In some implementations, the routing system may include a cost associated with a directed link based on the density of the directed links within a predetermined area in which the directed link is located. The routing system may include a density cost as part of the cost for traversing the adjacent directed link. For example, a routing graph or a geographical area may be divided into equal-sized areas. The equal-sized areas may be referred to as tiles. A tile may be based on longitude and latitude coordinates. The density of a particular tile may be determined based on the number of directed links that are included in the tile. The density of one tile may be compared with the density of a different tile. A cost associated with traversing a particular directed link may reflect the density of the tile in which the directed link is located. For example, a directed link in a lower density tile may be given a lower density value than the density value given to a different directed link located in a tile with a higher density of directed links. A routing system that includes a density value may permit the determination of a preferred route based on a preference for routes that occur through lower density regions. Lower density regions may correspond to rural routes, and higher density regions may correspond to urban routes.

When the routing system has determined a cost for the adjacent directed link, the routing system updates the adjacency set (step 455). When the adjacent directed link is not included in the adjacency set, the routing system updates the adjacency set by adding the adjacent directed link to the adjacency set and associating the cost determined in step 450 with the adjacent directed link in the adjacency set. When the adjacent directed link is included in the adjacency set, the routing system updates the adjacency set by first comparing the cost associated with the adjacent directed link in the adjacency set to the cost determined in step 450 for the adjacent directed link. Then the routing system updates (step 455) the adjacency set by updating the cost associated with the adjacent directed link with the cost determined for the adjacent directed link in step 450. This update may not be performed unless the cost determined in step 450 for the adjacent directed link is less than the cost associated with the adjacent directed link in the adjacency set.

When the routing system has updated the adjacency set (step 455), the routing system determines whether more directed links adjacent to the end node that is the focus point are to be processed (step 460). If so, the routing system proceeds to identify a directed link that is adjacent to the end node (step 430), as previously described above. If not, the routing system selects a directed link from the adjacency set (step 420) and proceeds as described previously.

When the routing system determines that the adjacent directed link is a directed link that enters a no-outlet region (sub-step 440*a*), the routing system determines whether the destination lies within a no-outlet region (sub-step 440*b*). If the destination is not within the no-outlet region, all routes that enter the no-outlet region may be skipped when determining the preferred route. The routing system discontinues processing of the adjacent directed link (sub-step 440*c*) (e.g., the routing system does not determine a cost for the adjacent directed link in step 450). This eliminates searching of all directed links that lie beyond the directed link that enters the no-outlet region. The routing system takes appropriate action to continue the search without processing the adjacent directed link. For example, the routing system may identify a different directed link that is adjacent to the end node of the selected directed link (step 430).

When the routing system determines that the destination lies within the no-outlet region (sub-step 440*b*), the routing system continues the processing of the directed link by determining a cost for the adjacent directed link (step 450). The routing system continues as described previously.

When no additional directed links are adjacent to the end node (step 460), the routing system may select a directed link for which the end node is used to expand the search (step 420).

When the routing system determines that the destination has been found or identified (step 425), the routing system determines the least-cost route (step 480). The routing system may determine the least-cost route by tracing back through the adjacent directed links that comprise the route. For example, the routing system may trace back through the adjacent directed links that comprise the route through the use of information that identifies the previous directed link for each directed link in the adjacency set. Other software engineering methods, processes or techniques may also be used to determine the least-cost route after the destination has been found. The least-cost route also may be referred to as a preferred route.

The capability of a routing system to identify a directed link that enters a no-outlet region may help improve the efficiency in which a preferred route is determined. For example, the directed links that emanate from the directed link that enters a no-outlet region may be eliminated from processing. In FIG. 3, the directed links HI 350L, IJ 355L, HJ 360L, and LK 365L may be eliminated from processing when GH 345L is identified as a directed link that enters the no-outlet region 380. The directed links HI 350L, IJ 355L, HJ 360L, and LK 365L may be referred to as no-outlet links.

Alternatively, when the destination lies within a no-outlet region, some implementations may eliminate the determination of whether a directed link enters a no-outlet region (step 440) for one or more portions of process 400. The determination of whether a directed link enters a no-outlet region (step 440) may be performed for some of the directed links selected in step 430 and not for other directed links selected in step 430. For example, when a directed link is selected in step 430 and the directed link is within a predetermined distance from the destination, the determination of whether a directed link enters a no-outlet region (step 440) may be skipped. This allows the search to proceed to the destination. When a directed link is selected in step 430 and the directed link is not within a predetermined distance from the destination, the determination of whether a directed link enters a no-outlet region (step 440) may be performed. When the determination of whether a directed link enters a no-outlet region (step 440) is eliminated for portions of process 400 (e.g., the determination is performed for some directed links and not for other directed links), the determination of a preferred route may be more efficient than if the determination of whether a directed link enters a no-outlet region was not performed for any directed links during the performance of process 400.

The elimination of a directed link that enters a no-outlet region and/or directed links that occur within a no-outlet region may help improve the efficiency with which a preferred route is determined. The directed link itself and the directed links that emanate from the directed link (e.g., the no-outlet links within the no-outlet region) may be eliminated from processing. This may result in a substantial reduction of the number of directed links processed during the determination of a preferred route.

Some implementations may select a particular node in step 420 and identify a directed link that is adjacent to the selected node in step 430.

The use of directed links when a preferred route is determined may provide advantages over a conventional method of processing nodes to determine a route. For example, a route determination process that uses nodes may prohibit a route that passes through the same node more than once in a route. This restriction may result in a less-than-optimal route under some circumstances, such as when particular types of turn restrictions are imposed on a preferred route. For instance, when a preferred route includes a left turn at a particular intersection of two roads and a left turn is prohibited at the intersection, the preferred route may go straight through the intersection, make three right turns, and pass straight through the intersection a second time (because the left turn is prohibited). Such a preferred route may be prohibited in a node-based processing system that prohibits a route that passes through the same node more than once.

Figure 5:
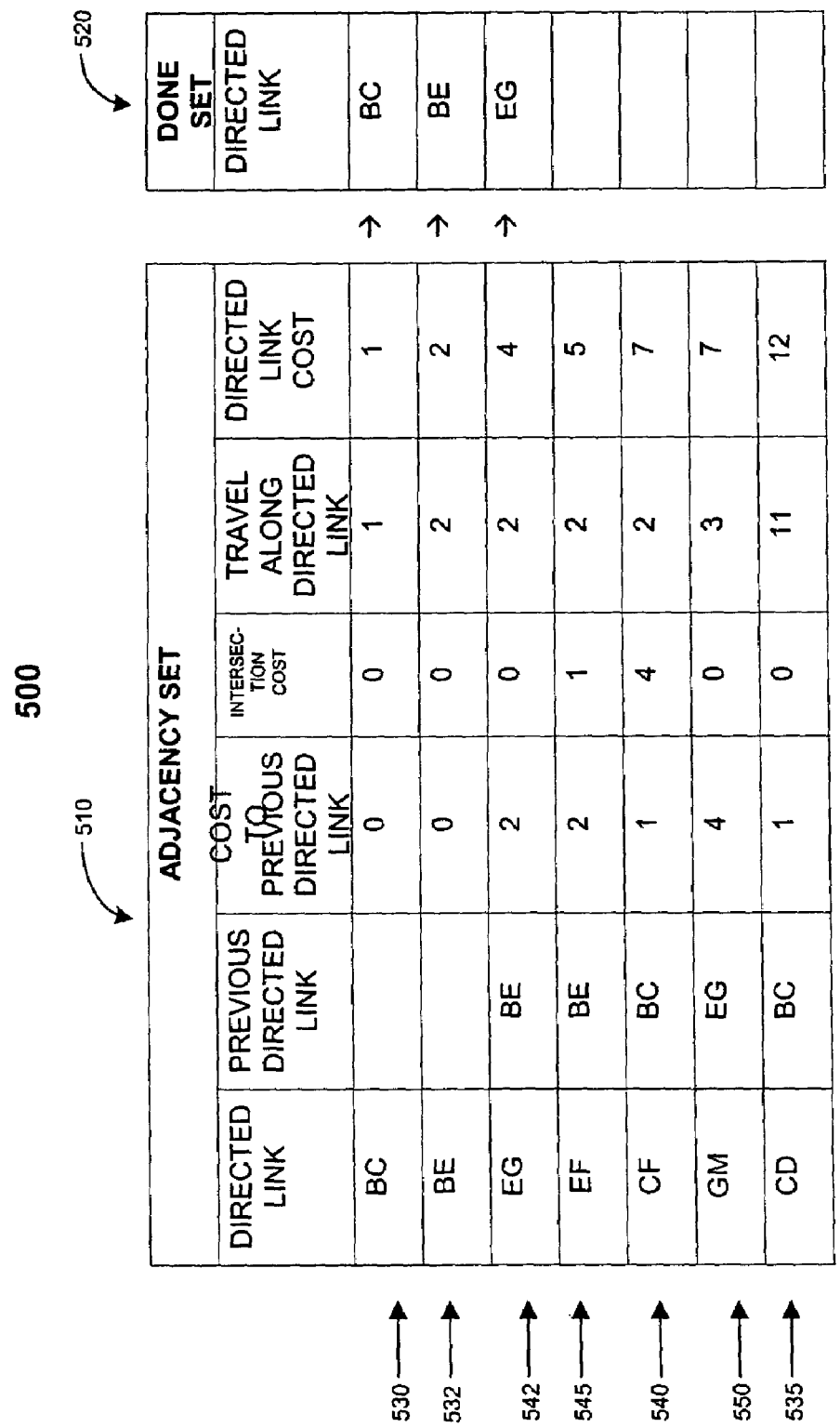
FIG. 5 is a block diagram that illustrates the results of determining a preferred route.

FIG. 5 illustrates the results of determining a preferred route using directed links. A preferred route is determined from node B 315N to node M 375N in routing graph 300 of FIG. 3. Data 500 includes an adjacency set 510 that includes one or more directed links that have been identified by the routing system as adjacent (or otherwise near) a particular portion of the route graph 300 (e.g., adjacent to an end node of a particular directed link). The adjacency set also may be referred to as a priority set.

Data 500 also includes a done set 520 that includes one or more directed links for which processing has been completed. The done set 520 also may be referred to as a completed set. A particular directed link is moved from the adjacency set 510 to the done set 520 when the routing system has completed processing of the particular directed link.

The routing system begins the routing determination process with the adjacency set 510 and the done set 520 empty of directed links. The routing system receives node B 315N as the origin and node M 375N as the destination node. For example, the nodes may be received in a manner similar to the manner described with respect to step 410 in FIG. 4. The routing system accesses node information for node B 315N to determine that the directed link BC 315L and the directed link BE 325L are adjacent to node B 315N, for example, in a manner similar to the manner described with respect to step 430 in FIG. 4. The routing system adds the directed link BC 530 and the directed link BE 532 to the adjacency set. For each directed link BC and BE in the adjacency set, the routing system determines a directed link cost. The directed link cost is determined in a manner similar to the manner described with respect to step 450 in FIG. 4. Specifically, the routing system determines the directed link cost by summing the previous cost to get to the start node of the directed link, an intersection cost associated with traveling through the intersection of the previous directed link and the directed link, and a cost associated with traversing the directed link. The directed link BC includes the origin node B 315N as the starting node. Here, the previous cost for the directed link is zero, as is the intersection cost. The cost to traverse directed link BC 315L is 1 as shown in FIG. 3. The routing system associates the directed link cost of 1 with the directed link BC 530 in the adjacency set 510. Similarly, the routing system determines a directed link cost of 2 for directed link BE 532. Because the directed link BE 325L emanates from the starting node B 315N, the directed link cost for directed link BE is based on the cost of 2 to traverse the directed link, as shown in FIG. 3.

The routing system selects directed link BC (particularly, end node C) to use as a focus point in expanding the adjacency set, for example, in a manner similar to the manner described with respect to step 420 in FIG. 4. Specifically, directed link BC has the least directed link cost of the directed links BC 530 (with a directed link cost of 1) and BE 532 (with a directed link cost of 2) in the adjacency set. The routing system accesses node information for node C 320N to determine that directed links CD 320L and CF 330L in FIG. 3 are adjacent to directed link BC 315L, for example, in a manner similar to the manner described with respect to step 430 in FIG. 4. The routing system also may determine that directed link CB is adjacent to node B 315N. The routing system does not process directed link CB because directed link CB requires a U-turn and typically is not the preferred route. Some implementations may process directed link CB in the same manner as the routing system processes directed links CD 320L and CF 330L in FIG. 3.

The routing system determines that the destination node M 375N in FIG. 3 has not yet been identified, for example, in a manner similar to the manner described with respect to step 425 in FIG. 4.

The routing system selects directed link CD 320L as a particular adjacent directed link with which to work (see, e.g., step 430 in FIG. 4). The routing system determines that CD 320L is not a directed link that enters a no-outlet region (see, e.g., step 440 in FIG. 4). The routing system then determines the cost for directed link CD 320L (see, e.g., step 450 in FIG. 4). The cost from the origin (here, B 315N) to the previous directed link (here, BC) is 1 as reflected in the cost associated with directed link BC 530 in the adjacency set. The routing system adds the intersection cost associated with traveling through the intersection of directed link BC and directed link CD. Here, the route travels straight through node C 320N. The intersection cost associated with traveling straight through node C 320N is 0, as shown in FIG. 3. This intersection cost of 0 may reflect, for example, that a road name change does not occur and that the road that corresponds to directed link BC and directed link CD is an U.S. highway. The cost of traversing the adjacent directed link (here, CD 320L) is 11, as shown in FIG. 3. The routing system associates a cost of 12 with directed link CD 535 in the adjacency set 510.

The routing system selects directed link CF 330L as a particular adjacent directed link with which to work (see, e.g., step 430 in FIG. 4). The directed link CF 330L is a directed link adjacent to the end node C 320N of directed link BC. The routing system determines that the directed link CF 330L is not a directed link that enters a no-outlet region and so proceeds to determine a cost associated with the directed link CF 330L that is adjacent to end node C of directed link BC. The routing system determines the cost for directed link CF 330L. The cost from the origin (here, B 315N) to the previous directed link (here, BC) is 1 as reflected in the cost associated with directed link BC 530 in the adjacency set. The routing system adds the intersection cost associated with traveling through the intersection of directed link BC and directed link CF. Here, the intersection cost associated with the geometry of the roads turning left through node C 320N is 4, as shown in FIG. 3. The cost of traversing the adjacent directed link (here, CF 330L) is 2, as shown by FIG. 3. The routing system associates a cost of 7 with directed link CF 540 in the adjacency set 510. The routing system stores the directed link CF 540 in sort order in the adjacency set 510, as shown in FIG. 5.

The routing system determines that no more directed links are adjacent to end node B 315N (see, e.g., step 460 in FIG. 4). The routing system moves the directed link BC 530 from the adjacency set 510 to the done set 520. This may help improve the efficiency of determining a preferred route. For example, moving a directed link from the adjacency set 510 to the done set 520 may permit the routing system to select the first directed link in the adjacency set without determining whether the first directed link has been processed (e.g., the directed links adjacent to the end node of the directed link have been identified and a cost has been associated with each adjacent directed link).

The routing system selects directed link BE (particularly, end node E) to use as a focus point in expanding the adjacency set. The routing system selects directed link BE 532 because directed link BE 532 has the least cost of the directed link remaining in the adjacency set (e.g., the directed links that have not yet been processed). The routing system also may determine that directed link EB is adjacent to node E 330N. The routing system does not process directed link EB because directed link EB requires a U-turn from node E 330N and typically is not the preferred route.

The routing system determines that the destination node M 375N in FIG. 3 has not yet been identified (e.g., step 425 in FIG. 4).

The routing system accesses node information to determine that directed link EG 340L in FIG. 3 is adjacent to directed link BE 325L (see, e.g., step 430 in FIG. 4). The routing system determines that directed link EG 340L is not a directed link that enters a no-outlet region. The routing system determines the directed link cost for the directed link EG 340L. The cost from the origin to the previous directed link (here, BE) is 2, based on the directed link cost of BE 532 in the adjacency set. The intersection cost associated with traveling through the intersection of BE 325L to EG 340L is 0, as shown in FIG. 3. This intersection cost may be based on the types of roads that intersect or other intersection costing factors and condition information. The cost to traverse directed link EG 340L is 2. The directed link cost for EG 340L is 4. The routing system associates the directed link cost of 4 with directed link EG 542 in the adjacency set 510.

The routing system proceeds with determining the directed link cost for directed link EF 335N in FIG. 3. The cost from the origin to the previous directed link (here, BE) is 2, based on the directed link cost of BE 532 in the adjacency set. The intersection cost associated with traveling through the intersection of BE 325L to EF 335N is 1, as shown in FIG. 3. This intersection cost may be based on the type of roads that intersect, a name change of the intersecting roads, the geometry of the intersection, or other intersection costing factors or intersection condition information. The cost to traverse directed link EF 335N is 2. The directed link cost for EF 335N is 5. The routing system associates the directed link cost of 5 with directed link EF 545 in the adjacency set 510.

The routing system determines that no more directed links are adjacent to end node E 330N, for example, in a manner similar to the manner described with respect to step 460 in FIG. 4. The routing system moves the directed link BE 532 from the adjacency set 510 to the done set 520.

The routing system selects directed link EG 542 (particularly, end node G) to use as a focus point in expanding the adjacency set based on the directed link cost of the directed links in the adjacency set 510. The routing system selects directed link EG 542 because the directed link EG 542 has the least cost of the directed links that remain in the adjacency set (e.g., the directed links that have not yet been processed). The routing system determines that the destination node M 375N in FIG. 3 has not yet been identified, for example, in a manner similar to the manner described with respect to step 425 in FIG. 4.

The routing system accesses node information to determine that directed link GH 345L in FIG. 3 is adjacent to directed link EG 340L (see, e.g., step 430 in FIG. 4). The routing system determines that directed link GH 345L is a directed link that enters a no-outlet region. Consequently, the routing system may not determine the directed link cost for the directed link GH 345L. The directed link GH 345L is not be placed in the adjacency set 510 or the done set 510. This may help ensure that directed links that are accessible only through GH 345L, such as directed links HI 350L, IJ 355L, HL 360L, and LK 365L, are not processed. This may help improve the efficiency of determining a preferred route.

The routing system proceeds with determining the directed link cost for directed link GM 370L in FIG. 3. The cost from the origin to the previous directed link (here, EG 542) is 4, based on the directed link cost of EG 542 in the adjacency set. The intersection cost associated with traveling through the intersection of EG 340L to GM 370L is 0, as shown in FIG. 3. This intersection cost may be based on the type of roads that intersect, a name change of the intersecting roads, the geometry of the intersection, or other intersection costing factors or intersection condition information. The cost to traverse directed link GM 370L is 3, as shown in FIG. 3. The directed link cost for GM 370L is 7. The routing system associates the directed link cost of 7 with directed link GM 550 in the adjacency set 510.

The routing system determines that no more directed links are adjacent to end node G 340N (see, e.g., step 460 in FIG. 4). The routing system moves the directed link EG 542 from the adjacency set 510 to the done set 520. In some implementations, the routing system may move the directed link to the done set when the directed link is selected in step 420.

The routing system determines that the destination node M 375N in FIG. 3 has been identified (see, e.g., step 425 in FIG. 4). In some implementations, the routing system may continue to search for a preferred route even after identifying the destination node. A routing system may continue to search even after identifying the destination node because the first route identified may not be the preferred route. In some implementations, particularly in implementations that move a selected directed link to the done set in step 420, the routing system may continue processing a selected route until the directed link that includes the destination end node is place in the done set. For example, the routing system may continue processing until the directed link GM is placed in the done set 520. The routing system may select and process the directed link EF 335L (steps 420-455) and select the directed link GM in step 420. The routing system then may add the directed link GM to the done set and determine that the destination has been found.

The routing system determines the least-cost route by traversing from the directed link that includes the destination node as an end node. Here, the routing system traverses from directed link GM 370L to directed link EG 340L to directed link BE 325L, which includes the origin node B 315N as a starting node. The routing system may traverse the directed links, for example, by storing the previous directed link for each directed link in the adjacency set 510. Some implementations may use other software engineering methods, processes, and/or techniques to traverse the directed links that are included in the preferred route. The least-cost and preferred route traverses BE 325L, EG 340L, and GM 370L.

Some implementations may use other software engineering methods, processes and/or techniques to determine the cost from the origin to a previous directed link when determining the directed link cost of a particular directed link. For example, the routing system may traverse the links from the previous link to the origin and accumulate the directed link cost for the each link traversed.

In some implementations, the adjacency set and done set may be a simple list or a sorted list. In such implementations, clearing the information associated with previous route determinations may be straightforward. Other implementations may store temporary information per node or directed link in the route network. The temporary information may describe whether a particular node or particular directed link belongs to an adjacency set, a done set, or neither the adjacency set or done set. The temporary information also may describe the associated cost and predecessor information for a node or directed link. In such implementations, the time to determine a preferred route may be reduced when the routing system does not clear or initialize the associated cost and/or predecessor directed link in the temporary information before beginning the determination of a preferred route. The determination of a preferred route is not affected because the routing system associates a cost and predecessor directed link when the directed link is processed (e.g., the cost and predecessor directed link from a previous route determination is overwritten with the cost and predecessor directed link associated with the current route determination process).

For example, temporary information may include for each directed link, an associated cost, a predecessor directed link, and an indication of whether the directed link has been processed (e.g., moved to a done set or the adjacency set). The routing system may prepare the temporary information for the start of a new search by modifying each indicator to indicate that the directed link to which the indicator relates has not been processed (not in either the adjacency nor done set). The cost and predecessor directed link information from the prior route determination process may be modified (e.g., overwritten) by the subsequent route determination process. This may provide efficiency improvements over an implementation that removes, deletes, or otherwise clears the entire temporary information before starting a new search. Similarly, efficiency improvements may occur when only portions of the temporary information are cleared from the routing system memory or other data storage device.

Figure 6:
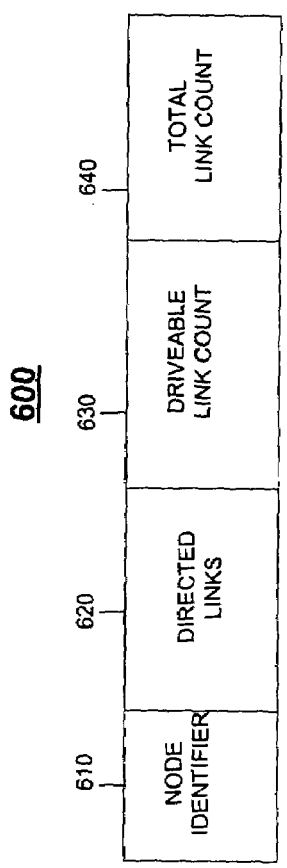
FIGS. 6 and 7 are block diagrams of example data structures used in determining a preferred route.

FIG. 6 is an example of a data structure 600 for node information. Node information may be used by one or more steps in the determination of a preferred route. The data structure 600 represents an example of how node information may be organized. In general, the node information in data structure 600 is used in a process to determine a preferred route. In some cases, the node information in data structure 600 or portions of the node information in data structure 600 may be created and stored using data structure 600 during a process to determine a preferred route. This may be referred to as the dynamic generation of node information.

The node information data structure 600 includes a node identifier 610, directed links 620, a driveable link count 630, and a total link count 640. The node identifier 610 uniquely identifies the particular node. Directed links 620 identify the directed links that are adjacent to the node. For example, directed links 620 may include a list of the directed link identifiers that are adjacent to the node. Directed links 620 also may point to a position in a directed link index that is associated with the first directed link that is adjacent to the node. When the directed link index is organized so that the directed links adjacent to a particular node are linked, additional directed links that are adjacent to the node also may be identified. The driveable link count 630 indicates the number of drivable directed links that are adjacent to the node. The total link count 640 indicates the total number of links (e.g., driveable directed links and non-driveable directed links) that are adjacent to the node. In some implementations, the node identifier 610 may be determined based on the position information of the node relative to one or more other nodes and/or one or more directed links.

Figure 7:
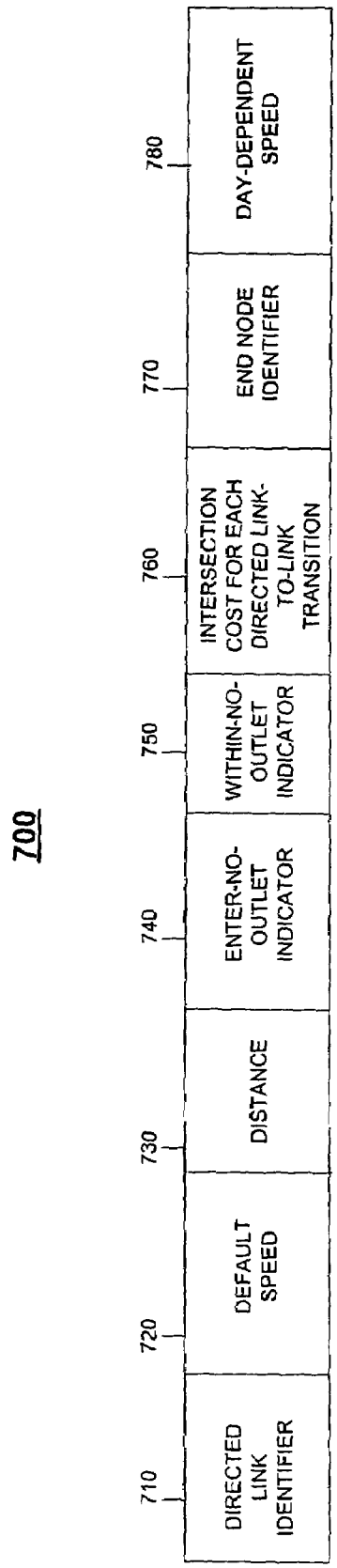

FIG. 7 is an example of a data structure 700 for directed link information. Directed link information may be used by one or more steps in the determination of a preferred route. The data structure 700 represents an example of how directed link information may be organized. In general, the directed link information in data structure 700 is used in a process to determine a preferred route. In some cases, the directed link information in data structure 700 or portions of the directed link information in data structure 700 may be created and stored using data structure 700 during a process to determine a preferred route. This may be referred to as the dynamic generation of directed link information.

The directed link data structure 700 includes a directed link identifier 710, a default speed 720, a distance 730, an enters-a-no-outlet-region indicator 740, a within-no-outlet indicator 750, an intersection cost for each directed-link-to-link transition 760, an end node identifier 770, and a day-dependent speed array 780. The directed link identifier 710 uniquely identifies a particular directed link. The default speed 720 identifies an average speed for traversing the directed link. The distance 730 indicates the distance to traverse the directed link. Collectively, the default speed 720 and the distance 730 may be used to determine a cost to traverse the directed link. Some implementations may include a default cost in lieu of or in addition to the default speed 720 and the distance 730. The enters-a-no-outlet-region indicator 740 identifies a directed link that enters a no-outlet region, as described previously with respect to FIGS. 3-5. The within-no-outlet indicator 750 indicates whether the directed link is located within a no-outlet region, as described previously with respect to FIGS. 3 and 5. The intersection cost for each directed link-to-link transition 760 includes an intersection cost for each alternative at an intersection. For example, the intersection cost may indicate a cost for proceeding straight through the intersection without turning, turning right at an intersection, and turning left at an intersection. The end node identifier 760 uniquely identifies the particular node that is the end node of the directed link.

The day-dependent speed array 780 includes a collection of speeds, with each speed being applicable to a day of the week or a day of the year (e.g., a holiday). For example, a speed may be associated with a day of the week, and a speed may be associated with a day of the year (e.g., a holiday). Alternatively, a speed may be associated with either (1) a weekday (Monday through Friday) that is not a holiday; (2) a weekend; or (3) a weekday (Monday through Friday) that is a holiday. Some implementations may associate a speed with a portion of a day and a day of the week (e.g., 8-9 a.m. of non-holiday Mondays through Fridays). Additionally or alternatively, some implementations also may associate a speed with a portion of a day and a day of the year.

Some implementations may allow for different national holidays to be selected based on the location of the route (e.g., a route within the United States would be based on holidays observed in the United States, whereas a route within Germany would be based on holidays observed in Germany). Alternative software engineering techniques and data structures may be used for time-dependent speed information. For example, an associated data structure (e.g., a sub-segment or a sub-type) may be used that associates the time-dependent data (stored collectively or in separate attributes) with a particular directed link.

Some implementations may include a start node identifier. The ability to traverse between node information, such as the node information that uses node information data structure 600 in FIG. 6, and directed link information, such as directed link information that uses directed link information data structure 700, may be useful in determining a preferred route. For example, a routing process may identify the directed links that are adjacent to a particular node, then identify the end node of a particular directed link, then identify the directed links from that end node, and so on.

Some implementations may use other software engineering techniques to identify a particular node and/or a particular directed link. For example, a geographic tiling method may be used in which a geographic region, such as the United States, is overlaid with a grid of blocks or tiles. Each tile may correspond to a portion of the geographic region and may be interlinked. For each tile, the latitude and longitude coordinates may be associated with a particular reference point of a tile (e.g., the lower left corner of a tile). A particular location (e.g., a particular node or a particular directed link) may be identified based on an association with a particular tile and the location of the particular location within the tile.

Figure 8:
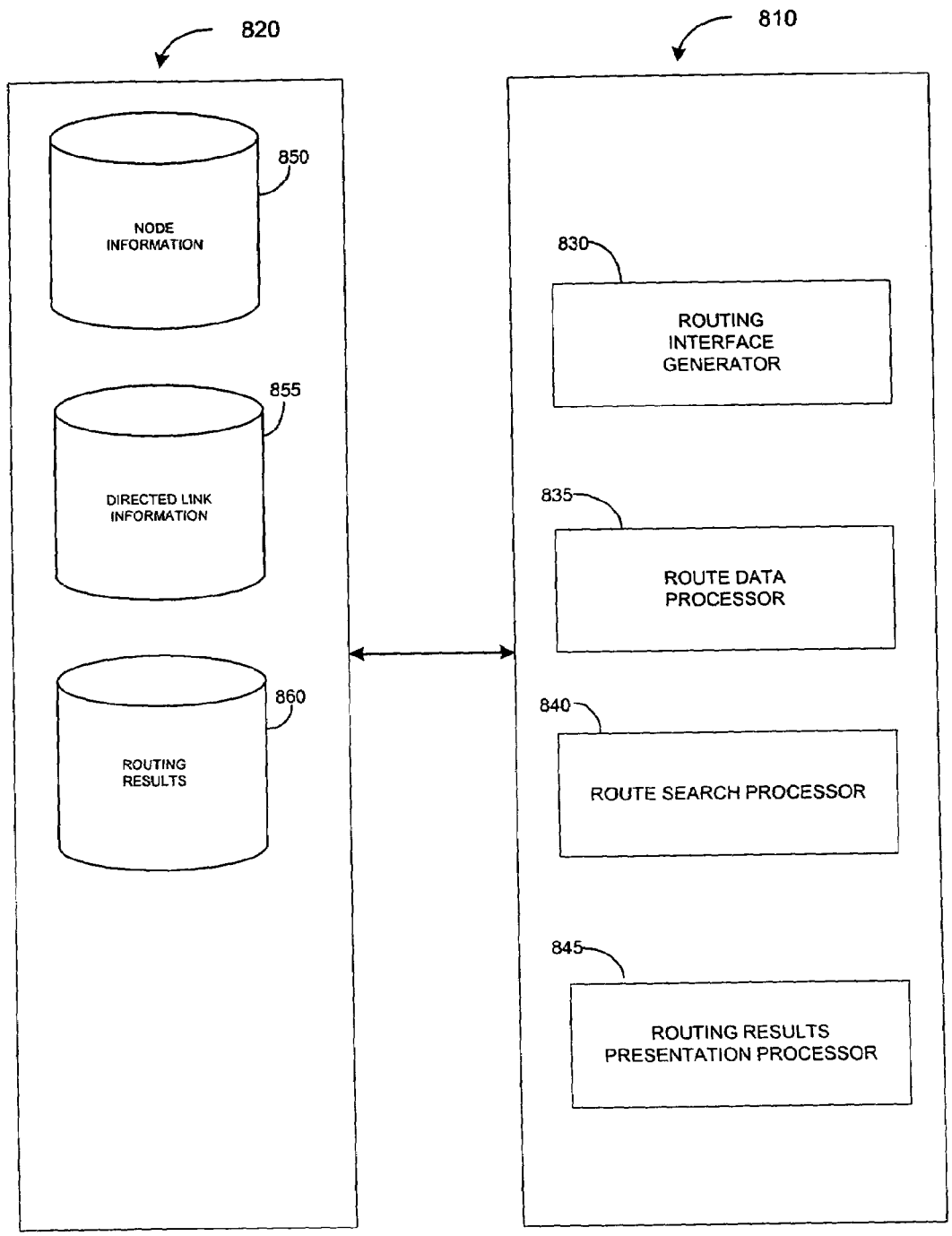
FIG. 8 is a diagram of components that may be used for determining a preferred route.

FIG. 8 depicts the components 800 that may be used in determining a preferred route. The routing system may be, for example, host system 110 of FIG. 1 or host system 210 of FIG. 2. The components 800 include processing components 810 and data components 820. The processing components 810 include routing interface generator 830, a route data processor 835, a route search processor 840, and a route results presentation processor 845. The data components include node information 850, directed link information 855, and routing results 860.

The routing interface generator 830 may generate a user interface for communicating with a user. For example, the user interface generated by the routing interface generator 830 may receive information from a user and initiate a process to determine a preferred route based on information received from a user. The information received may include an origin location, a destination location, or both. The information received also may include routing preferences, such as a preference for a rural route over an urban route, and a date, day of the week, day of the year, and/or time in which travel is expected to occur.

The route data processor 835 may use geographic, road or other routing data to transform the routing data into node information 850 and directed link information 855 that may be used in determining a preferred route. Node information 855 may include information about particular nodes, such as the node information described with respect to FIG. 4 and the node information data structure 600 in FIG. 6. Directed link information 855 may include information about particular directed links, such as directed link information described with respect to FIG. 5 and the directed link data structure 700 in FIG. 7.

The route search processor 840 may direct and control the determination of a preferred route, such as described with respect to FIG. 4. The route search processor 840 may store the preferred route determined or other routing results in routing results 860. The route search processor 840 may provide the routing results to the routing-results-presentation processor 845. The routing results presentation processor 845 may present the routing results.

Figure 9:
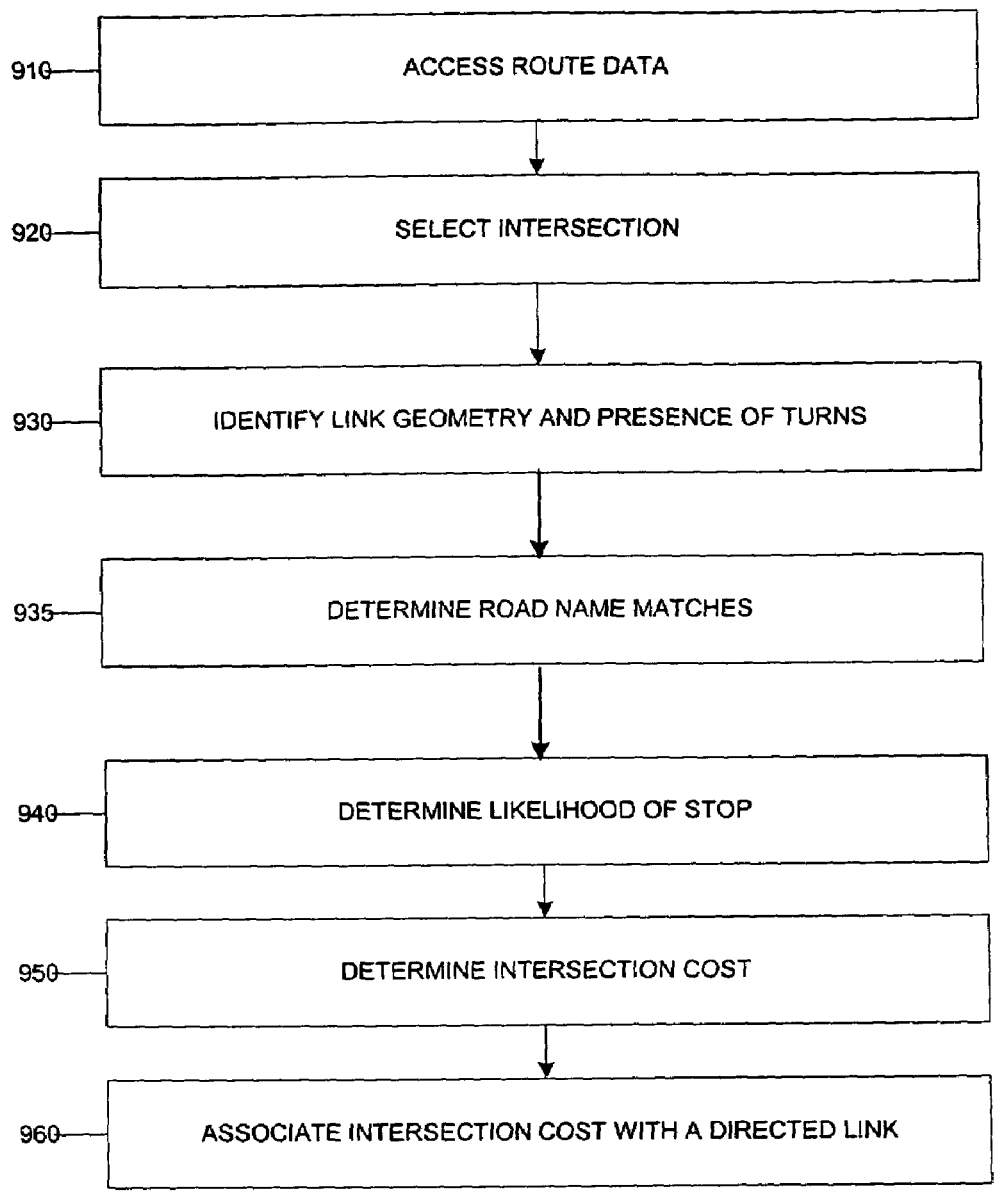
FIGS. 9 and 10 are flow charts illustrating processes that may be performed to determine a preferred route.

FIG. 9 illustrates a process 440 to determine an intersection cost and associate the intersection cost with a directed link. The process 440 may be performed on a predetermined or as-needed basis to determine intersection costs prior to or during the execution of a process to determine a particular preferred route. For example, the process 440 may be performed when new route network data is developed or received. Alternatively or additionally, the process 440 may be performed dynamically during a process to determine a preferred route. Intersection costs also may be referred to as turn costs. The process to determine a preferred route may be performed by a routing system, such as, for example, host system 110 of FIG. 1 or by host system 220 of FIG. 2.

In the process 440, the routing system accesses route data (step 910) and selects a particular intersection for which the intersection cost is to be determined (step 920). The routing system identifies the link geometry and the presence of turns (step 930). For example, the routing system determines whether a turn restriction is associated with a particular link-to-link transition. A link-to-link transitions may represent a particular turn in an intersection. An example of a turn restriction may include when a turn onto a one-way link or from a one-way link is prohibited. When a turn onto a one-way link is not prohibited, such a turn may be given a relatively high cost compared with other types of turns. Similarly, a simple U-turn may be prohibited or given a relatively high cost.

The routing system also may identify a false intersection. A false intersection may occur when a circumstance occurs (such as a road name change occurs or a turn is encountered) that typically is associated with an intersection but an intersection does not occur. For example, a false intersection may occur when a road crosses a state line or a county boundary. For a false intersection, the routing system may determine a cost based on whether a road name matches and/or the turn magnitude. For example, when a highway crosses a state boundary, the name of the road may not change and a sharp turn may not be associated with the link. A low cost or no cost may be associated with such an intersection. A false intersection that includes a sharp turn may be associated with a higher cost than a false intersection that does not include a sharp turn. A false intersection in which the names of the roads do not match may be associated with a higher cost or a much higher cost than the false intersection of roads that have matching names.

The routing system may identify an intersection that proceeds to a ferry and associate a high cost to such an intersection.

One or more ramp-to-ramp transitions also may be identified and a cost may be associated with each type of ramp-to-ramp transition. A ramp-to-ramp transition may include the intersection of three ramps. This ramp-to-ramp transition may be associated with no cost or a low cost when the ramps continue without a sharp turn. When a sharp turn is included in a ramp, a low cost may be associated with the ramp. When there is a complex intersection of more than three ramps, a higher cost may be associated with the ramp-to-ramp transition than a ramp intersection including three ramps. A high cost may be associated with a ramp that crosses a road. A ramp that crosses a road may indicate a route that exits a highway and then re-enters the highway. Such a route generally is not a preferred route and a high intersection cost is associated with this case.

A simple merge from a ramp to a non-ramp (e.g., a road) may be identified and a cost may be associated with each transition from a ramp to a non-ramp. Some implementations may not identify an intersection cost associated with a simple merge from a ramp to a road and may only identify an intersection cost associated with a ramp that exits a highway. Alternatively, some implementations may identify an intersection cost associated with a simple merge from a ramp to a road and not identify an intersection cost associated with a ramp that exits a highway. The approach of associating an intersection cost only with a ramp that exits a highway or only with a ramp to a road may ensure that the route determination approach does not unduly penalize the use of a ramp. When an intersection cost is associated with a simple merge from a ramp to a road, the intersection cost associated may be higher when the simple merge includes a sharp turn than when the merge does not include a sharp turn.

Other types of ramp to non-ramp intersections that are not a simple merge may be identified, such as a "merge right" intersection, a "merge left" intersection, and a "merge cross" intersection. A "merge right" intersection in which a ramp to a non-ramp merge occurs when a road is located to the immediate right of the merge may be identified. The cost associated with a "merge right" intersection may be based on the road class type of the road. For example, a higher intersection cost may be associated with a "merge right" intersection when a state road is involved than when a local road is involved.

A "merge left" intersection in which a ramp to non-ramp merge occurs when a road is located to the immediate left of the merge may be identified. The cost associated with a "merge left" intersection may be based on the road class type of the road.

A "merge cross" intersection in which a ramp to non-ramp merge is not a simple merge and a road is not located to the immediate left or immediate right. The cost associated with a "merge cross" intersection may be based on the highest road class type at the intersection.

A transition from a non-ramp (e.g., a road) to a ramp may be identified and an intersection cost may be associated with the transition. A transition from a non-ramp to a ramp may be referred to as an exit. A simple exit may include three links in which the link adjacent to the other link is a ramp. The adjacent link may be referred to as a "to link." The other link may be referred to as a "from link." In a simple exit, the "from link" is one-way. The intersection cost associated with a simple exit that includes a sharp turn may be higher than the intersection cost associated with a simple exit that does not include a sharp turn.

Other types of non-ramp-to-ramp intersections that are not a simple exit may be identified, such as a "left exit" intersection, a "left exit from a one-way road" intersection, and an "exit crossing" intersection. A "left exit" intersection is an intersection in which the "to link" is a ramp to the immediate left and the "from link" is a two-way road. Generally, a route that uses a "left exit" intersection crosses a lane of traffic to make the turn. A higher cost may be associated with a "left exit" intersection than a simple exit intersection.

A "left exit from a one-way road" intersection is an intersection in which the "to link" is a ramp to the immediate left and the "from link" is a one-way road. The intersection cost associated with a "left exit from a one-way road" may be less than the "left exit" intersection cost.

An "exit crossing" intersection is an intersection in which the ramp is across a road that is of a road class type that is equal to or better than the road class type associated with the "from link." In such a case, a stop is highly probable and a substantial intersection cost may be associated with the exit crossing.

An intersection that includes a limited-access link to another limited-access link may be identified and an intersection cost may be associated with each link-to-link transition. A limited-access link is a road to which access is limited. Examples of a limited-access road includes a service road and a divided highway. An intersection of a merge of two divided highways is an example of a limited-access link to another limited-access link intersection. The intersection of a merge of two divided highways may be associated with a moderate intersection cost because traffic congestion may often occur at such a merge. A merge of two limited-access links in which neither of the names of the limited-access links match with the names of the links proceeding from the intersection may be associated with a substantial intersection cost.

An intersection that includes a limited-access link to a non-limited-access link may be identified and an intersection cost may be associated with the each link-to-link transition. When the names of the links at the intersection do not change, a low intersection cost may be associated with the transition. Such a transition may occur, for example, when a divided highway ends and the road continues as a single lane in each direction. When the names of the links at the intersection change, a moderate or substantial intersection cost may be associated with the transition. Such a transition may occur, for example, with a turn onto a service road or a U-turn.

An intersection that includes three links may be identified and an intersection cost may be associated with each link-to-link transition. When three links intersect, one link continues, and no name changes occur at the intersection, a low intersection cost is associated with the transition. When three links intersect, a road is on the immediate right or straight ahead through the intersection, the intersection cost associated with the transition is based on the stop level of the intersection (e.g., the difference between the road class type associated with each intersecting link). Similarly, when three links intersect, a road is on the immediate left or straight ahead through the intersection, the intersection cost associated with the transition is based on the stop level of the intersection (e.g., the difference between the road class type associated with each intersecting link). When three links intersect, a link is a ramp, and the intersection includes a link that does not have a matching name, a moderately high intersection cost is associated with the transition. When three links intersect, a road is on the immediate left, immediate right, or straight ahead thorough the intersection, the intersection cost associated with the transition is based on the stop level of the intersection plus a predetermined value. Typically, the predetermined value is the same or higher than the cost of intersection cost associated with a three-link intersection in which a non-matching name of a link occurs.

An intersection that includes four or more links may be identified and an intersection cost may be associated with each link-to-link transition in the intersection. The intersection cost associated with a right turn may be a predetermined value (e.g., 2) plus the stop level associated with the intersection. The intersection cost associated with the left turn may be a predetermined value (e.g., 4) plus the stop level associated with the intersection. The intersection cost associated with crossing the intersection (e.g., proceeding straight through the intersection without turning) may be a predetermined value (e.g., 3) plus the stop level associated with the intersection.

When a standard intersection includes the name change of one of the roads, typically a substantially higher intersection cost is associated with that link-to-link transition. For example, the intersection cost for a right turn may be a predetermined value (e.g., 10) plus the stop level associated with the intersection. The intersection cost for a left turn may be a predetermined value (e.g., 13) plus the stop level associated with the intersection. The intersection cost for crossing the intersection may be a predetermined value (e.g., 12) plus the stop level associated with the intersection.

The routing system determines road name matches (step 935). The routing system may determine whether the names of two roads on the opposite sides of an intersection of two or more roads match. When the names of two roads on opposite sites of an intersection do not match, a higher cost may be associated with the intersection than when the names of two roads on opposite sides of an intersection match. This may help reduce the number of maneuvers or turns performed in a determined route.

The routing system determines the likelihood of a stop (step 940). The routing system may determine the likelihood of a stop (e.g., a stop level) based on the types of roads that intersect. For example, the stop level of an intersection may be based on the intersection of two roads of differing road class type (e.g., an interstate, a U.S. highway, a state road, and a local road). A value may be assigned to each road class type. For example, a value of 2 may be associated with an interstate, a value of 4 may be associated with a U.S. highway, a value of 6 may be associated with a state road, and a value of 7 may be associated with a local road. A stop level may be determined by determining the difference between the value associated with the road class type of the "from link" with the value associated with the road class type of the "to link." In some implementations, the range of permitted stop level values may be limited (e.g., may range from −2 to +2).

The routing system determines an intersection cost (step 950). The determination may be based on the analysis performed in step 930, step 940, or other types of analysis. An intersection cost may be determined for each turn or link-to-link transition associated with a particular intersection.

The routing system associates the determined intersection cost with a directed link (step 960). For example, the intersection cost may be included in a directed link data structure, such as data structure 700 in FIG. 7.

Referring to FIG. 10, a routing system may use a process 450 to determine the directed links that enter a no-outlet region and the directed links that are within a no-outlet region for routing data. The process 450 may be performed on a predetermined or as-needed basis prior to the execution of a process to determine a particular preferred route. For example, the process 450 may be performed when new route network data is developed or received. Alternatively or additionally, the process may be performed dynamically during a process to determine a preferred route. The process to determine a preferred route may be performed by a routing system, such as, for example, host system 110 of FIG. 1 or host system 220 of FIG. 2.

The process 450 determines whether a particular directed link is a no-outlet link. The process may be applied to one or more directed links in routing data. The process 450 begins when a directed link is received (step 1010). The directed link that is received may be associated with a starting node (here, an origin node) and an ending node (here, a destination node). The routing system uses the routing data to determine whether two-way travel is permitted along the received link (step 1015). For example, the routing system may look-up the directed link in the routing data that identifies whether a particular road or directed link permits two-way travel. When the routing system determines that two-way travel is not permitted along the directed link, the routing system does not identify the directed link as a no-outlet link and the process 450 ends (step 1020). In some implementations, the directed link may be identified in one or more data structures, such as data structure 600, as a no-outlet link.

When the routing system determines that two-way travel is permitted along the directed link, the routing system determines whether the origin node (e.g., the starting node of the directed link) is a terminal node (step 1030). A terminal node is a node that connects to only one other node through a connection that is a two-way link. Two directed links connect a terminal node with the other node. One of the directed links includes the terminal node as a starting node, and the other directed link includes the terminal node as an end node. A link that connects with a terminal node may be a dead-end street or a cul-de-sac. Travel from the terminal node may not be restricted. When the routing system determines that the origin node of the directed link is a terminal node, the routing system does not identify the directed link as a no-outlet link and the process 450 ends (step 1020), as described previously.

When the routing system determines that the origin node of the directed link is not a terminal node, the routing system determines whether the destination node of the directed link is a terminal node (step 1040). If so, the routing system identifies the directed link as a no-outlet link and the process ends (step 1050). In general, travel to a terminal node may be restricted.

When the routing system determines that the destination node of the directed link is not a terminal node, the routing system performs a search from the destination node of the directed link to the origin node of the directed link (step 1070). Travel from the destination node to the origin node along the directed link is not permitted.

When the search finds the origin node (step 1080), the routing system does not identify the directed link as a no-outlet link and the process 450 ends (step 1020), as described previously. In such a case, an alternate path from the destination node to the origin node exists and the directed link is not a no-outlet link.

When the search is completed (e.g., no nodes remain that have not been searched) and the origin node has not been found (step 1090), the routing system identifies the directed link as a no-outlet link and the process ends (step 1050).

In some cases, the search may be terminated before the search is completed (step 1095). If so, the routing system does not identify the directed link as a no-outlet link and the process 450 ends (step 1020), as described previously. For example, a search may be terminated after searching for a predetermined length of time or after searching a predetermined number of nodes or links. The termination of a search at a certain point may be useful when searching a large number of links (e.g., a route graph that represents a road network that covers a large geographic region, such as a country or a state within a country). When a directed link exits from a no-outlet region, the entire route graph may need to be searched in step 1070 because there is no path back to the origin node (except for the disallowed link from the destination to the origin). The time required to search an entire route graph may be significant. The termination of the search at a certain point before completion may help improve the efficiency of the process 450.

When a directed link has been identified that enters a no-outlet region, the routing system traverses the network from the directed link that enters a no-outlet region to identify the directed links that are within a no-outlet region for routing data. In some implementations, the routing system may only identify the directed links that enter a no-outlet region.

Figure 11:
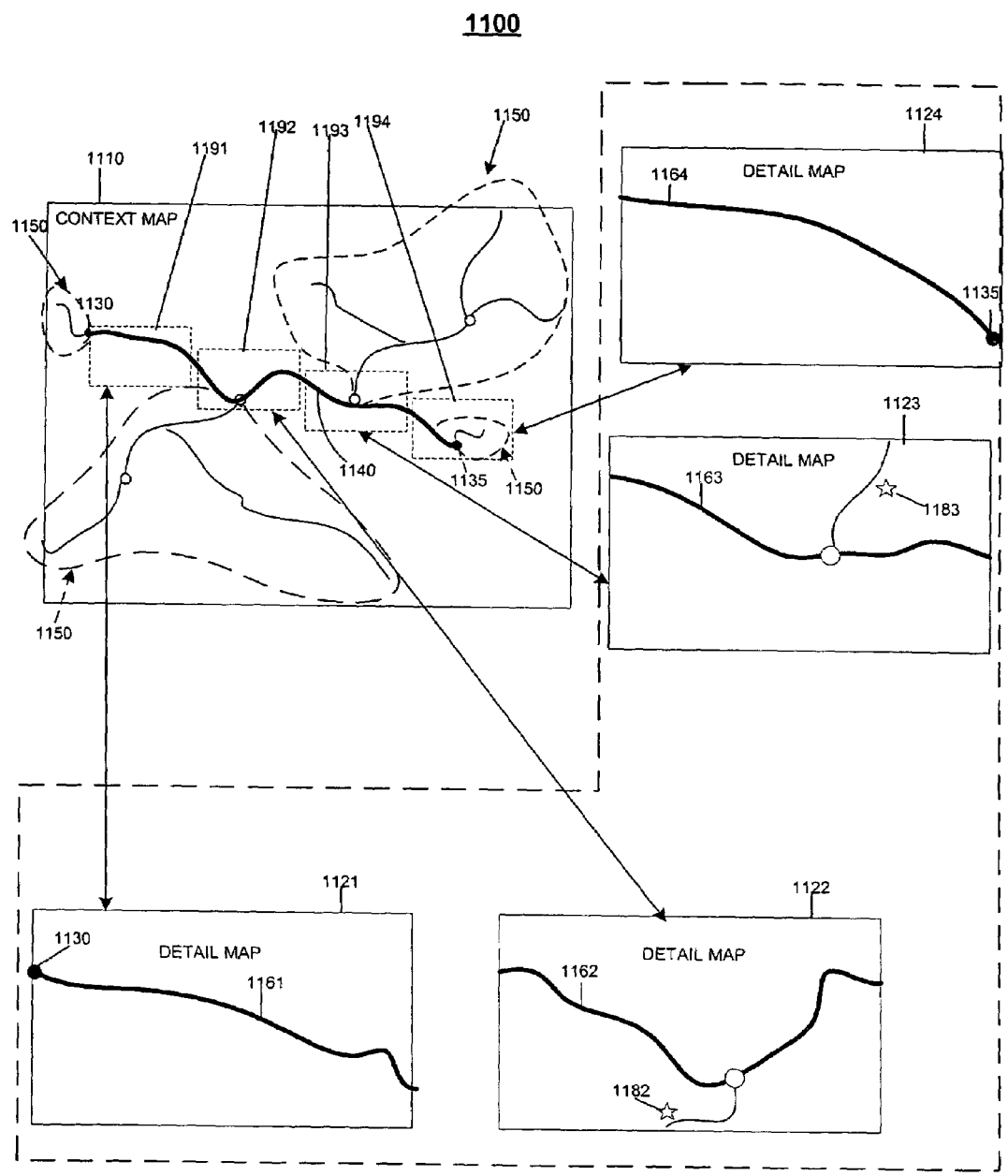
FIGS. 11 and 12 are diagrams illustrating route presentations that provide both context route information and detailed route information.

FIG. 11 illustrates a route presentation 1100 that provides both context route information and detail route information. The route presentation 1100 may be displayed on a client system display, such as the display 295 of FIG. 2. The route presentation 1100 also may be printed on a printer associated with a client system, such as the client system 105 of FIG. 1 or the client system 205 of FIG. 2, or may be displayed on a display associated with an on-board vehicle navigation system. The context route information is presented in the form of a map and may be referred to as a context map 1110 or an overview map.

The context map 1110 includes an origin location 1130, a destination location 1135, and a route 1140 between the origin location 1130 and the destination location 1135. The context map 1110 is uniformly scaled. The use of a uniform scale avoids distortion of distances and spatial locations, which may be advantageous to a user of the context map 1110. The context map 1110 may use an aspect ratio that is optimized to provide the greatest route visibility when the context map 1110 is displayed.

The context map 1110 provides context for the route 1140 by including geographic data 1150 near the route. The geographic data 1150 includes a variable road network display such that finer detail is provided near the route 1140 and less detail, or even no detail, is provided farther away from the route 1140. The geographic data 1150 also may include other geographic features, such as hydrology (e.g., rivers) and cities. The context map 1110 may include fewer labels for roads or other geographic features as compared to the number of labels included in the detail route information. Typically, the context map 1110 includes only the labels necessary to show context and provide spatial awareness to the user of the route presentation 1100.

The detail route information is presented as detailed maps 1121-1124. Each of detail maps 1121-1124 presents a portion 1161-1164, respectively, of the route 1140. The detail map 1121 includes the origin location 1130, and the detail map 1124 includes the destination location 1135. In general, each of the detail maps 1121-1124 includes greater detail and geographic features than are included in the context map 1110 for the corresponding portion of the route 1140. For example, each of the detail maps 1121-1124 may include a full road network.

The detail maps 1121-1124 also may include places of interest to provide detail for portions 1161-1164 of the route 1140. A place of interest (POI) may also be referred to as a point of interest. For example, the detail maps 1122 and 1123 include, respectively, POI 1182 and POI 1183. Examples of POIs include gas stations, restaurants, lodging, entertainment and educational opportunities (such as amusement parks, water parks, movie theaters, night spots, museums, and libraries), and historical or other types of landmarks.

The detail maps 1121-1124 represent a POI using a symbol, a bit-mapped image, or another type of image (collectively, "symbols"). A symbol may represent a type of POI (e.g., a lodging POI, a gas station, a historical landmark) or a particular POI (e.g., the United States Capitol or an amusement park may be represented by a particular symbol that is only used for that POI). Some implementations may use a single symbol to represent all POIs regardless of the type of the POI. The inclusion of POIs in the detail maps 1121-1124 may help a user to plan activities along the route. The inclusion of POIs also may provide an opportunity for the route presentation provider to obtain revenue by charging for the display of a POI on the detail maps, which may help create or invigorate a market for route presentation services.

In some implementations, a detail map may include different types of POIs along different portions of the route. For example, a route along a state road may include a scenic vista POI, a historic landmark POI, and a park POI, while a route along an interstate highway includes POIs for gas, food and lodging opportunities.

Additionally or alternatively, the types of POI presented may be based on the length of the route and the POI location along the route. For example, when a route is long and an overnight stay may be anticipated, convenience store POIs and gas station POIs may dominate the presentation of POIs near the origin location. As the route progresses, gas stations, fast-food restaurants, and hotels may dominate the presentation of POIs. Near the destination, hotels, full service restaurants, entertainment and nightspots, and tourist destinations may dominate the presentation of POIs. The types and proximities of POIs presented may be controllable by the user. For example, a user may select to drive eight hours in a day and hotels approximately eight hours away may be displayed (e.g., hotels that are less than six hours or more than ten hours are not displayed).

The context map 1110 includes detail map indications 1191-1194, each of which indicates the portion of the route 1140 included in a corresponding detail map. This may provide context such as where along the route the detail map is located (e.g., near the origin, near the destination, or in the middle of the route). The detail map location (or region of detail) may be indicated, for example, by an outline (here, a dotted outline), a transparent shaded region drawn over the overview map, or a representation of a magnifying glass.

A context map 1110 and a detail map 1121, 1122, 1123 or 1124 may use different scales when presenting route information. A detail map 1121, 1122, 1123 or 1124 may use the same or different scale as another detail map 1121, 1122, 1123 or 1124 for the context map 1110.

The route presentation 1100 may be interactive. For example, the context map 1110 may include one or more user-selectable portions that, when clicked or otherwise selected, present a corresponding detail map. The user-selectable portion may be the same as or different from the detail map indication 1191-1194 on the context map. The user also may select to re-display the context map 1110 after viewing the detail map, for example, by activating a control, such as a button or icon. The control may be referred to as a user-selectable indicator associated with the context map. The user may select to display another detail map. The user may continue to switch between the context map and a detail map.

The interactive presentation of detail maps may be advantageous, particularly when a user is familiar with a portion of the route and does not wish to receive detailed route information for the portion. With an interactive display, the user is able to select the portions of the route for which the user requires additional detail.

In some implementations, the context map may be a static map that may not be re-scaled or re-centered by the user. This may provide more efficient updating methods, such as using overlay planes or a stored bitmap of the context map, that may avoid redrawing the map when the user re-displays the context map after the display of a detail map.

The route presentation also may be user-controllable such that a user may determine the portions of a route that are printed. This may be referred to as interactive print control. Interactive print control may allow greater user control over the printing of map route details. With interactive printing, the user is able to select the portions of the route for which the user requires additional detail and print only the selected portions. For example, the user may select one or more detail maps to be printed. This may be particularly advantageous when a user is familiar with a portion of the route, such as a portion of the route near the home of the user, and the user only wants to print the portion of the route that is unfamiliar or not as familiar to the user.

The route presentation 1100 may be implemented by using a client application, such as client application 278 of FIG. 2, on a client system, such as the client system 105 of FIG. 1 or the client system 205 of FIG. 2. The host system, such as the host system 110 of FIG. 1 or the host system 210 of FIG. 2, may send data associated with the context map 1110 to the client system for display. While the client system displays the context map 1110, the host system sends the data associated with the detail maps 1121-1124 to the client system such that the detail map data is available at the client system when the user wants to display a detail map 1121, 1122, 1123 or 1124.

Figure 12:
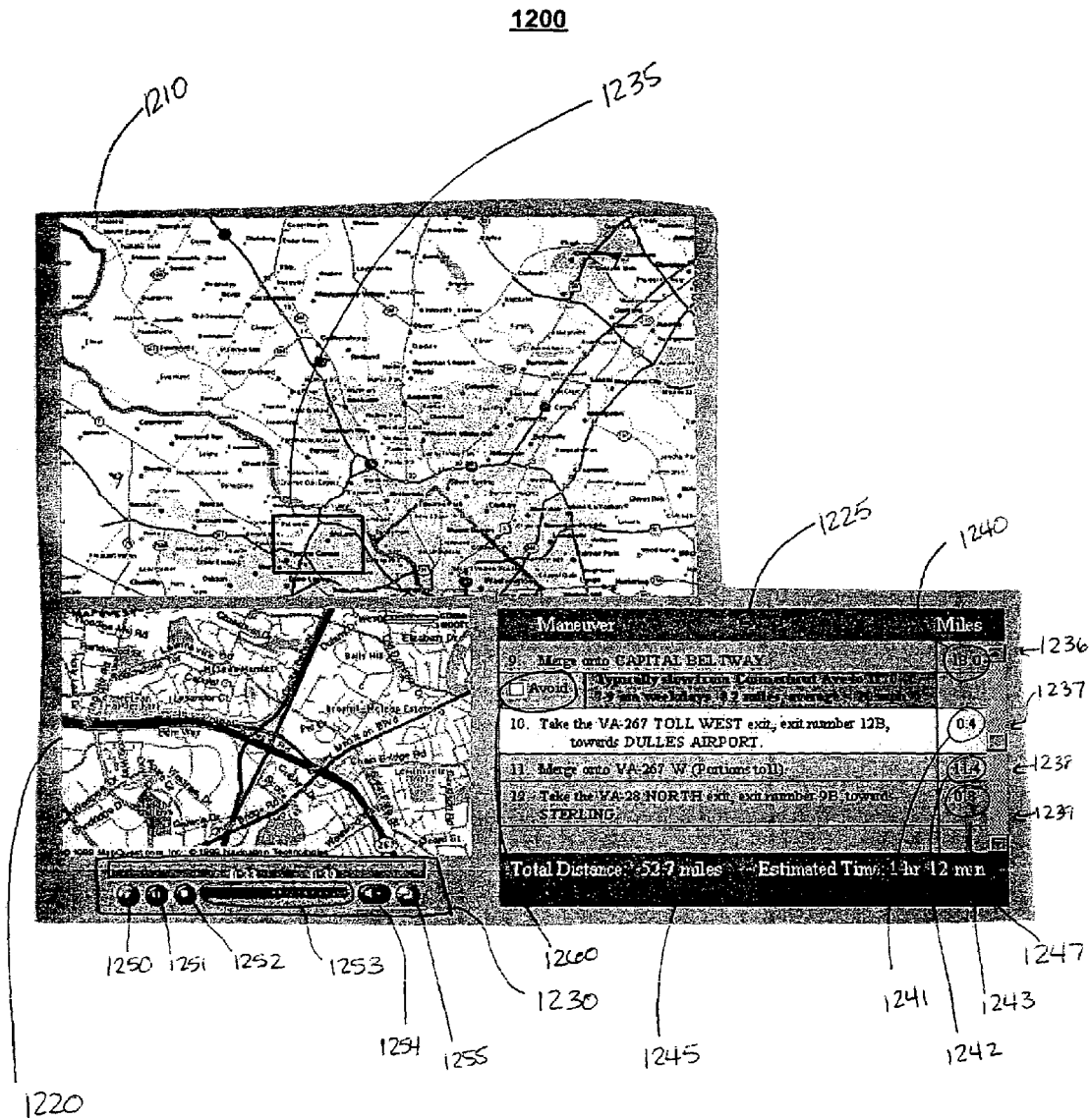

FIG. 12 describes a particular implementation of a route presentation 1200 that provides context route information and detail route information, and includes interactive controls. The route presentation 1200 may be displayed on a client system display, such as display 295 of FIG. 2, displayed on an on-board vehicle navigation system, or printed. The route presentation 1200 includes a context map portion 1210, a detail inset map portion 1220, a narrative driving direction portion 1225, and an animation control 1230.

The context map portion 1210 displays a context map that provides a variable road network display across the map such that finer detail is presented on the map near the route and less detail is presented on the map farther away from the route, as described previously with respect to context map 1110 of FIG. 11. The context map portion 1210 includes an indication 1235 of the location of the detail insert map 1220.

The detail insert map portion 1220 presents a detail insert map that includes a complete road network and labels, as described previously with respect to detail maps 1121-1124 of FIG. 11 for a portion of the route. The detail insert map also may include POIs and geographic features to provide detail for the area covered by the detail map. The detailed insert map portion 1220 uses a display area having a fixed geometric shape (e.g., rectangular) and a fixed size.

The detail insert map includes the maneuvers that occur within a predetermined distance of one another. Such a detailed map may be referred to as a maneuver map. The maneuvers are grouped to form a single detail insert map of multiple maneuvers. In the example shown by FIG. 12, the detail insert map includes the maneuvers of merging on a highway, exiting the highway at a particular toll road exit, merging on the toll road, and exiting the toll road at a particular exit toward a particular direction. Another detail insert map may include a series of turns in an urban area that occur within a predetermined distance (e.g., two miles) of one another.

In some implementations, a detail map may include a predetermined number of maneuvers that occur within a predetermined distance of one another. The predetermined number of maneuvers may be established based on a maximum number of maneuvers that may occur in one detail map, which may be particularly useful in an urban setting in which a large number of maneuvers may occur within a short distance.

A detail insert map that covers multiple maneuvers may be beneficial. For example, fewer detail maps are produced as compared with producing a separate detail map for each maneuver. This may result in display efficiency and a reduction in the number of pages required to print a route, that, in turn, may result in greater user satisfaction.

The narrative driving direction portion 1225 displays a scrolling list of text descriptions of each maneuver 1236-1239 presented in order of occurrence as the route is traversed. Each of maneuvers 1236-1239 is associated with a corresponding one of distances 1240-1243 at which the maneuver occurs relative to the previous maneuver. The narrative driving directions portion 1225 includes a total distance of the route 1245 and an amount of time estimated to travel the route 1247. The displayed maneuvers 1236-1239 correspond to the maneuvers shown within the detail inset map displayed in the detail inset map portion 1220. In some implementations, the presented narrative driving directions may correspond to the position of a cursor or other type of indicator on the context map in the context map portion 1210.

The presentation route 1200 includes interactive controls that allow the user to display a detail insert map 1220 and a maneuver in the narrative driving direction portion 1225 that corresponds to a position on the context map in the context map portion 1210 selected by the user. Similarly, when a user selects a particular maneuver included in the narrative driving directions portion 1220, a cursor or other type of indicator may be presented on the overview map at a point that corresponds to the selected maneuver. A detail insert map 1225 also may be automatically invoked or manually selected to present the selected maneuver. In some implementations, the interactive control may include controlling the display of a particular detail insert map only by selecting a position on the context map (e.g., the narrative driving directions do not control the display of a detail insert map).

The animation control 1230 permits a user to play an animation of traveling the route that displays a series of detail insert maps 1225 and narrative driving directions 1225 associated with each detail insert map as the detail insert map is displayed. Each detail insert map is presented in order from the origin location to the destination location until all detail insert maps have been presented or the animation has been paused or stopped. POI information, such as text and/or one or more images associated with a POI, may be presented on the detail insert map in the detail insert map portion 1225. Additionally or alternatively, POI information may be displayed in a separate POI portion or overlaid on the context map 1210.

The animation control 1230 may include a play control 1250, a pause control 1251, a stop control 1252, a position control 1253, and, optionally, volume controls 1254 and 1255. The user may use the play control 1250 to start the animation sequence, the pause control 1251 to pause the animation sequence such that the animation may be restarted from the point at which the animation was paused, and the stop control 1252 to stop the animation sequence. The user may use the position control 1253 (here, a sliding bar) to select the point in the route from which the animation will start when the play control 1250 is selected.

In some implementations, audio may be associated with the route. For example, audio may be associated with a POI on or near the route. When audio is associated with the route, the volume of the audio may be controlled using volume controls 1254 and 1255. Volume control 1254 increases the volume at which the audio associated with the route is played, while volume control 1255 decreases the volume at which the audio associated with the route is played.

In some implementations, the POI information is displayed for a particular location along the route when the animation is stopped at the location. In such an implementation, the user may control the animation to stop at various points in the animation and determine what points of interest are on the route or near the location at which the animation is stopped.

In some implementations, the route presentation 1200 may include alternative or additional interactive controls such that, when a user drags a cursor along, or otherwise selects, points along the route, the user may get a magnified image (e.g., a zoomed-in image) of the route that includes POI information.

The route presentation 1200 includes an avoid indicator 1260 that allows a user to avoid a particular maneuver in the route. For example, a user may wish to avoid traveling through a construction zone or a portion of a route in which the speed fluctuates, predictably or unpredictably, over the course of a day. When the user selects the avoid indicator 1260, a different route is determined from the origin location to the destination location that does not include the maneuver associated with the avoid indicator 1260 (e.g., maneuver 1236). In some implementations, a user may indicate that more than one maneuver in a route is to be avoided.

The route presentation 1200 may be implemented using a host system, such as the host system 110 of FIG. 1 or the host system 210 of FIG. 2, to send data for all or a portion of the map or route to a client system, such as the client system 105 of FIG. 1 or the client system 205 of FIG. 2. The client system stores the data received. In some cases, removable media may be used to transport map or route data to the client system. Storing route data or map data needed for the route presentation 1200 may result in a more efficient display process than if the route data or map data is accessed from the host system. A more efficient display process may lead to a faster display process that may, in turn, result in improved user satisfaction.

Figure 13:
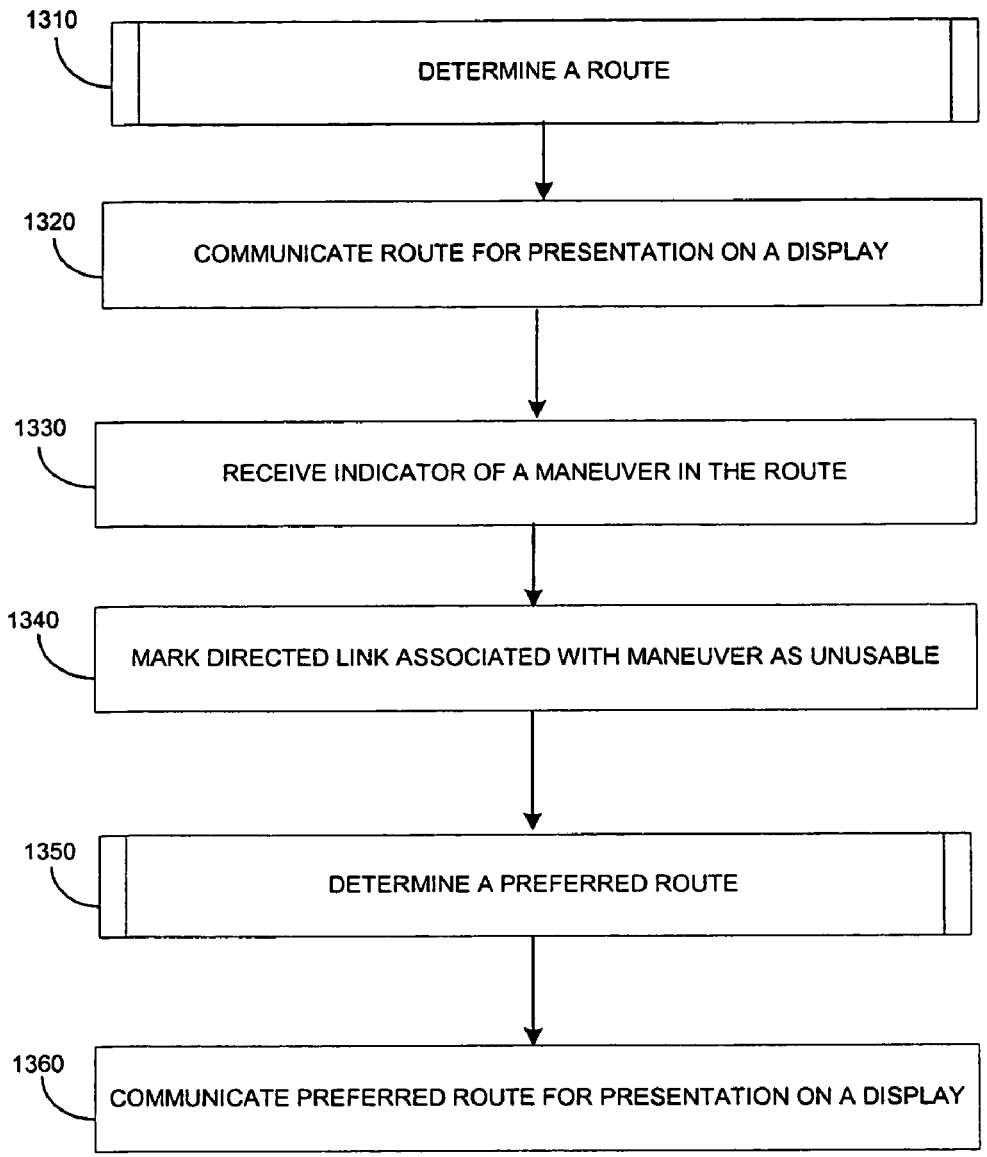
FIG. 13 is a flow chart depicting a rerouting process that generates a route that avoids a particular maneuver.

FIG. 13 illustrates a rerouting process 1300 that generates a route that avoids a particular maneuver. The process 1300 may be performed by a routing system, such as, for example, the host system 110 of FIG. 1 or the host system 210 of FIG. 2. The process 1300 begins with the determination of a route between an origin and a destination (step 1310). The determination of a route may be accomplished, for example, by a process the same as or similar to process 400 of FIG. 4 to determine a preferred route using directed links.

The routing system communicates the generated route for presentation on a display (step 1320). The route presentation may be displayed on a client system display, such as the display 295 of FIG. 2. The route presentation also may be printed on a printer associated with a client system, such as the client system 105 of FIG. 1 or the client system 205 of FIG. 2, or it may be displayed on a display associated with an on-board vehicle navigation system.

The routing system receives, or otherwise obtains, an indication of at least one maneuver in the route (step 1330). The indication may be referred to as a maneuver indicator or an avoid indicator. This may be accomplished, for example, by presenting a checkbox (or other type of button or user interface control) on a display and associating the checkbox with a particular maneuver. When a user checks the checkbox (or otherwise indicates a particular maneuver to avoid), the client system sends the maneuver to the routing system.

The routing system marks a directed link that is associated with the indicated maneuver as unusable (step 1340). This may be accomplished, for example, by including an avoid indicator in the directed link data structure, such as data structure 700 of FIG. 7. The avoid indicator may be used to mark a link that is associated with the maneuver to be avoided as being unusable in, for example, performing process 400.

The routing system then determines a preferred route that does not include the directed link that is marked as unusable (step 1350). When the routing system identifies an adjacent directed link to process (such as step 430 of process 400), routing system may determine whether the avoid indicator for the directed link is marked as unusable, and, if so, the routing system bypasses (or otherwise skips) the directed link that is marked as unusable. The routing system then identifies another adjacent directed link to process (such as in step 430 of process 400) or otherwise continues to determine the preferred route.

When the routing system has completed determining the preferred route, the routing system communicates the preferred route for presentation on a display (step 1360).

As an alternative to marking a directed link as unusable, the routing system may associate a substantial cost with a directed link that is associated with the maneuver to be avoided. For example, the routing system may heavily weight one or more cost components of a directed link in the directed link data structure, such as data structure 700 of FIG. 7. The cost components of a directed link may include average speed 720 for traversing the link or an intersection cost for each directed link-to-link transition 760. The increased cost associated with the directed link may reduce the likelihood of the direct link being used in a route that is subsequently determined.

In some implementations, more than one maneuver to be avoided may be indicated. Alternatively or additionally, the user may repeat the indication of one or more maneuvers to be avoided and the receipt of a new route based on the identified preference until the user is satisfied with the generated route.

In some implementations, the user may be able to view more than one route and select a preferred route. For example, the user may be able to view the original route and the second route that avoids at least one maneuver. The user then may be able to select the preferred route from the displayed routes.

In some implementations, the user may be able to store a list of maneuvers to be avoided in any route generated for that user. The user may view and modify the list of maneuvers to be avoided.

In one implementation, for example, a user may request that a route be determined between an origin location and a destination location. The route determined and presented to the user may include traversing a particular interstate that the user is reluctant to drive. The user may indicate that the particular interstate is to be avoided. Another route that excludes the particular interstate that the user wishes to avoid is determined and presented to the user. In other cases, for example, a user may wish to avoid mountainous terrain, a rotary, a particular section of an interstate roadway, a particular intersection, or a particular merge of two roads. The user may request a route without those features be determined.

Although FIGS. 1-13 illustrate systems and methods for determining a preferred driving route, the techniques are not limited to driving routes. These techniques may be applicable to determining a preferred route using other modes of transportation (e.g., walking, bicycling, flying, swimming, or navigating a water route). These techniques may be applicable, for example, to one or more computing devices for determining a preferred route that communicate in a client system and host system (e.g., an Internet access provider or an Internet service provider) relationship, a single computing device (e.g., with or without networking capabilities), or an embedded system (e.g., a navigation routing system in an automobile or other vehicle).

Implementations may include a method or process, an apparatus or system, or computer software on a computer medium. It is intended that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components.

Other implementations are within the scope of the following claims.

What is claimed is:

1. A computer implemented method for determining a route, the method comprising:

receiving a request for a first route between a first origin and a first destination from a user;

determining first route maneuvers associated with the first route;

communicating the first route maneuvers to the user;

receiving a user selection of one of the first route maneuvers as an avoided maneuver;

storing the avoided maneuver in a list of maneuvers to be avoided;

receiving, after the storage of the avoided maneuver, a request for a second route between a second origin and a second destination from the user;

accessing, in response to the received request for the second route, the list of maneuvers to be avoided; and determining second route maneuvers based upon accessing the list, the second route maneuvers not including the avoided maneuver.

2. The method of claim 1 further comprising using an in-vehicle navigation system to present a maneuver included in the second route.

3. The method of claim 1 further comprising presenting the second route on a user system.

4. The method of claim 1 further comprising communicating the second route to a user system.

5. The method of claim 4 wherein communicating the second route to a user system comprises communicating the second route over a connection that is established using the Internet Protocol.

6. The method of claim 1 wherein storing the avoided maneuver in a list of maneuvers to be avoided includes storing the avoided maneuver as associated with the user.

7. The method of claim 1 wherein receiving a request for a first route and a request for a second route each include receiving a request for a route from the user.

8. The method of claim 1 wherein the received request for a second route is for a route that is not associated with a route previously requested, before the receipt of the user selection of one of the first route maneuvers.

9. The method of claim 1 wherein storing the avoided maneuver in a list of maneuvers to be avoided includes storing the avoided maneuver in a list of maneuvers to be avoided for later use in other routes.

10. The method of claim 1 wherein storing the avoided maneuver in a list of maneuvers to be avoided includes associating a substantial cost with the avoided maneuver.

11. The method of claim 1 wherein storing the avoided maneuver in a list of maneuvers to be avoided includes storing an avoid indicator in a directed link data structure associated with the avoided maneuver.

12. The method of claim 1 wherein storing the avoided maneuver in a list of maneuvers to be avoided includes storing the avoided maneuver such that the avoided maneuver is unusable or storing the avoided maneuver such that the likelihood of the maneuver being used in the route is reduced.

13. The method of claim 12 wherein storing the avoided maneuver in a list of maneuvers to be avoided includes storing the avoided maneuvers such that the maneuver is unusable.

14. The method of claim 12 wherein storing the avoided maneuver in a list of maneuvers to be avoided includes storing the avoided maneuver such that the likelihood of the maneuver being used in the route is reduced.

15. A computer implemented method for determining a route, the method comprising:

receiving a request for a first route between a first origin and a first destination from a user;

determining first route maneuvers associated with the first route;

communicating the first route maneuvers to the user;

receiving a user selection of one of the first route maneuvers as an avoided maneuver;

storing the avoided maneuver in a list of maneuvers to be avoided;

processing one or more maneuvers available for inclusion in the route, for each maneuver, the processing including:

determining that the maneuver may be included in the route, and determining a cost associated with the maneuver;

processing the avoided maneuver, the processing including:

determining that the avoided maneuver is included in the list of maneuvers to be avoided, and associating, based on the list, a different cost with the avoided maneuver, and selecting some of the processed maneuvers for inclusion in a second route, the selection being based at least in part on the cost of the maneuvers.

16. An apparatus for determining a route, the apparatus being configured to:

receive a request for a first route between a first origin and a first destination from a user;

determine first route maneuvers associated with the first route;

communicate the first route maneuvers to the user;

receive a user selection of one of the first route maneuvers as an avoided maneuver;

store the avoided maneuver in a list of maneuvers to be avoided;

receive, after the storage of the avoided maneuver, a request for a second route between a second origin and a second destination from the user;

access, in response to the received request for the second route, the list of maneuvers to be avoid; and determine second route maneuvers based upon accessing the list, the second route maneuvers not including the avoided maneuver.

17. The apparatus of claim 16 wherein the apparatus comprises an in-vehicle navigation system to present a maneuver included in the second route.

18. The apparatus of claim 16 further configured to present the second route on a user system.

19. The apparatus of claim 16 further configured to communicate the second route to a user system.

20. The apparatus of claim 16 further configured to communicate the second route over a connection that is established using the Internet Protocol.

21. The apparatus of claim 16 further configured to receive the user selection of one of the first route maneuvers as an avoided maneuver.

22. The method of claim 15 wherein selecting some of the processed maneuvers for inclusion in a second route includes processing the determined or associated costs to determine which selection of maneuvers minimize the total or average cost.

23. The method of claim 15 wherein associating a different cost with the avoided maneuver includes associated a numerical value with the maneuver that is large enough to prevent the avoided maneuver from being included in the second route.

24. The method of claim 15 wherein associating a different cost with the avoided maneuver includes associating the avoided maneuver with a bypass indication.

* * * * *